Figure 2:
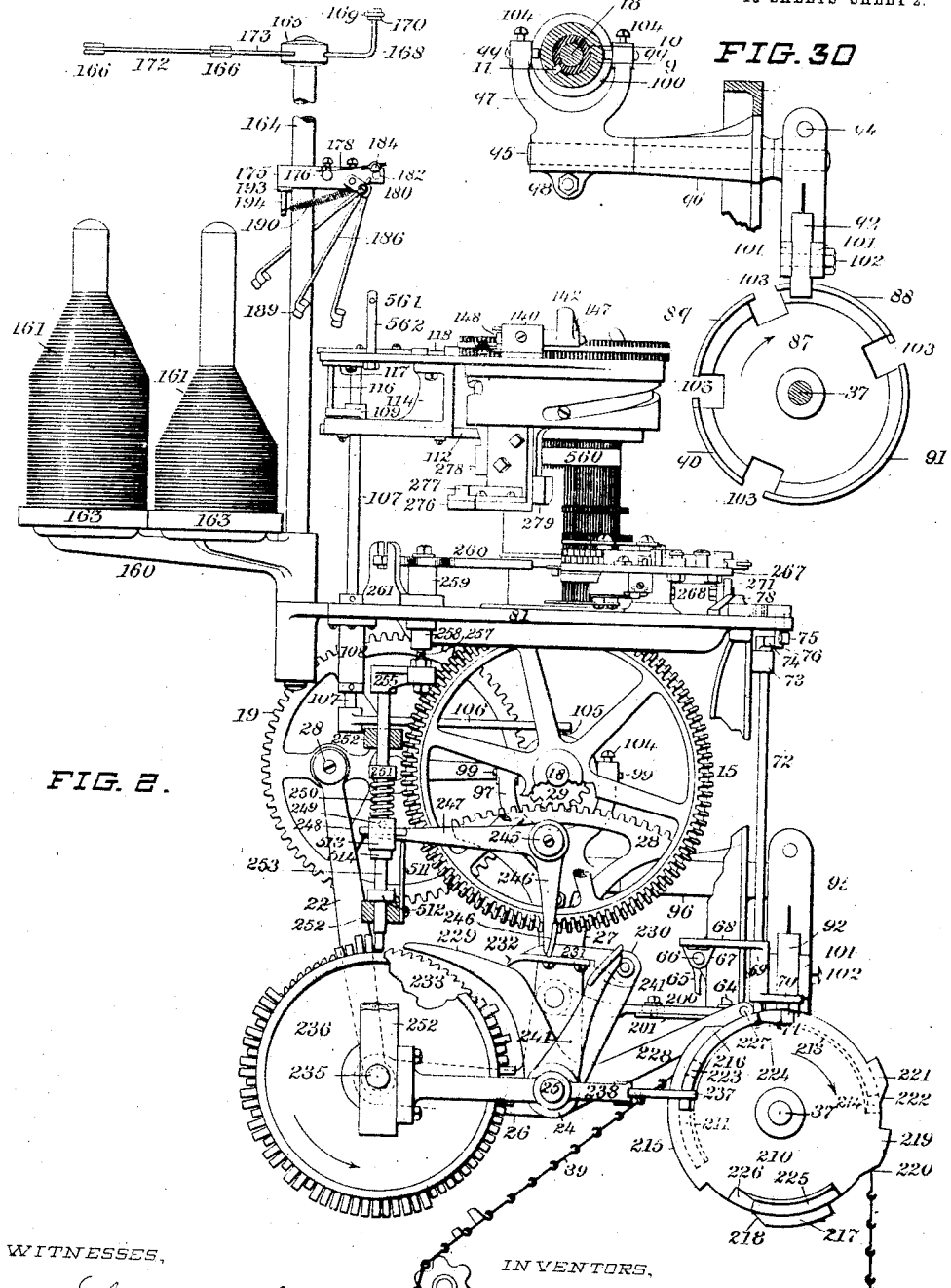

G. E. COTTRELL & S. L. SHIPPEY.
MACHINE FOR KNITTING STOCKINGS.
APPLICATION FILED SEPT. 10, 1907.
1,034,346.
Patented July 30, 1912.
13 SHEETS—SHEET 1.
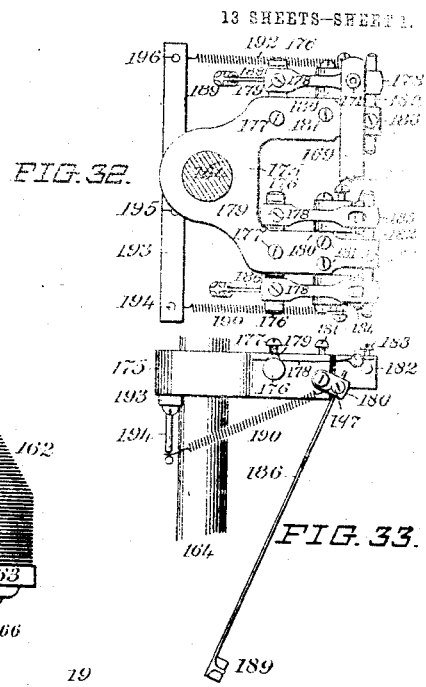
FIG. 32.
FIG. 33.
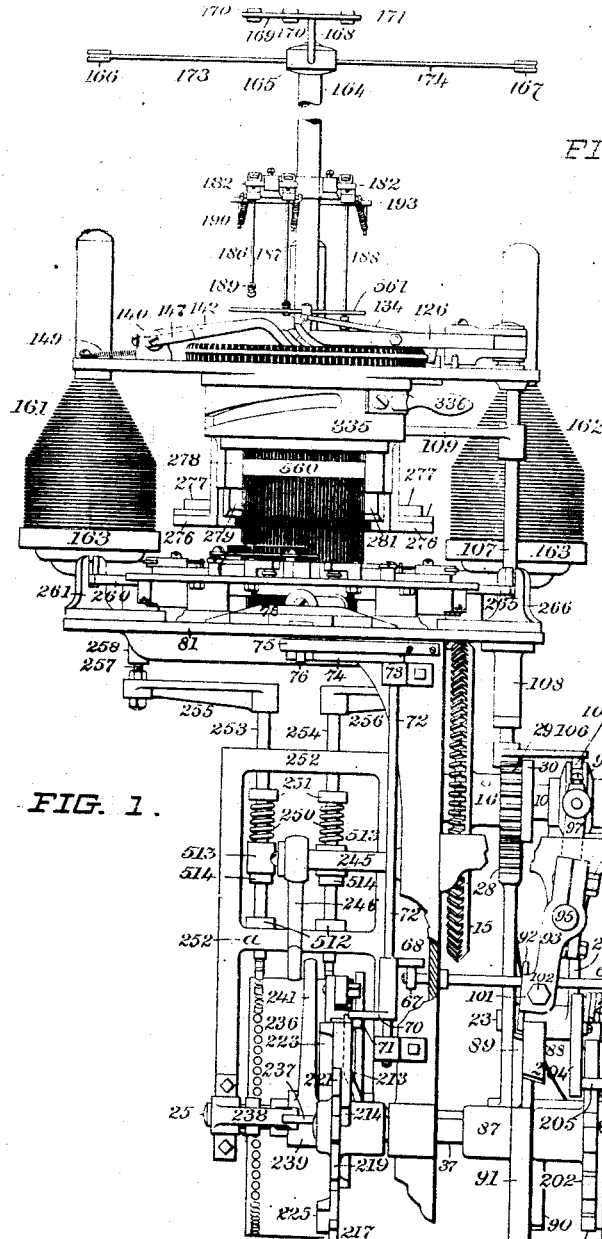
FIG. 1.
WITNESSES
George Haynes
Charles H. Haughton
INVENTORS
GEORGE E. COTTRELL,
STEPHEN L. SHIPPEY.
BY THEIR ATTORNEY,
Franklin Scott.

G. E. COTTRELL & S. L. SHIPPEY.
MACHINE FOR KNITTING STOCKINGS.
APPLICATION FILED SEPT. 10, 1907.

1,034,346.

Patented July 30, 1912.
13 SHEETS—SHEET 4.

WITNESSES,
George Haynes.
Charles W. Houghton

INVENTORS,
GEORGE E. COTTRELL.
STEPHEN L. SHIPPEY.
BY Franklin Scott,
ATTORNEY.

G. E. COTTRELL & S. L. SHIPPEY.
MACHINE FOR KNITTING STOCKINGS.
APPLICATION FILED SEPT. 10, 1907.

1,034,346.

Patented July 30, 1912.

13 SHEETS—SHEET 5.

WITNESSES,
George Haynes.
Charles H. Houghton.

INVENTORS,
GEORGE E. COTTRELL.
STEPHEN L. SHIPPEY.

BY THEIR ATTORNEY,
Franklin Scott.

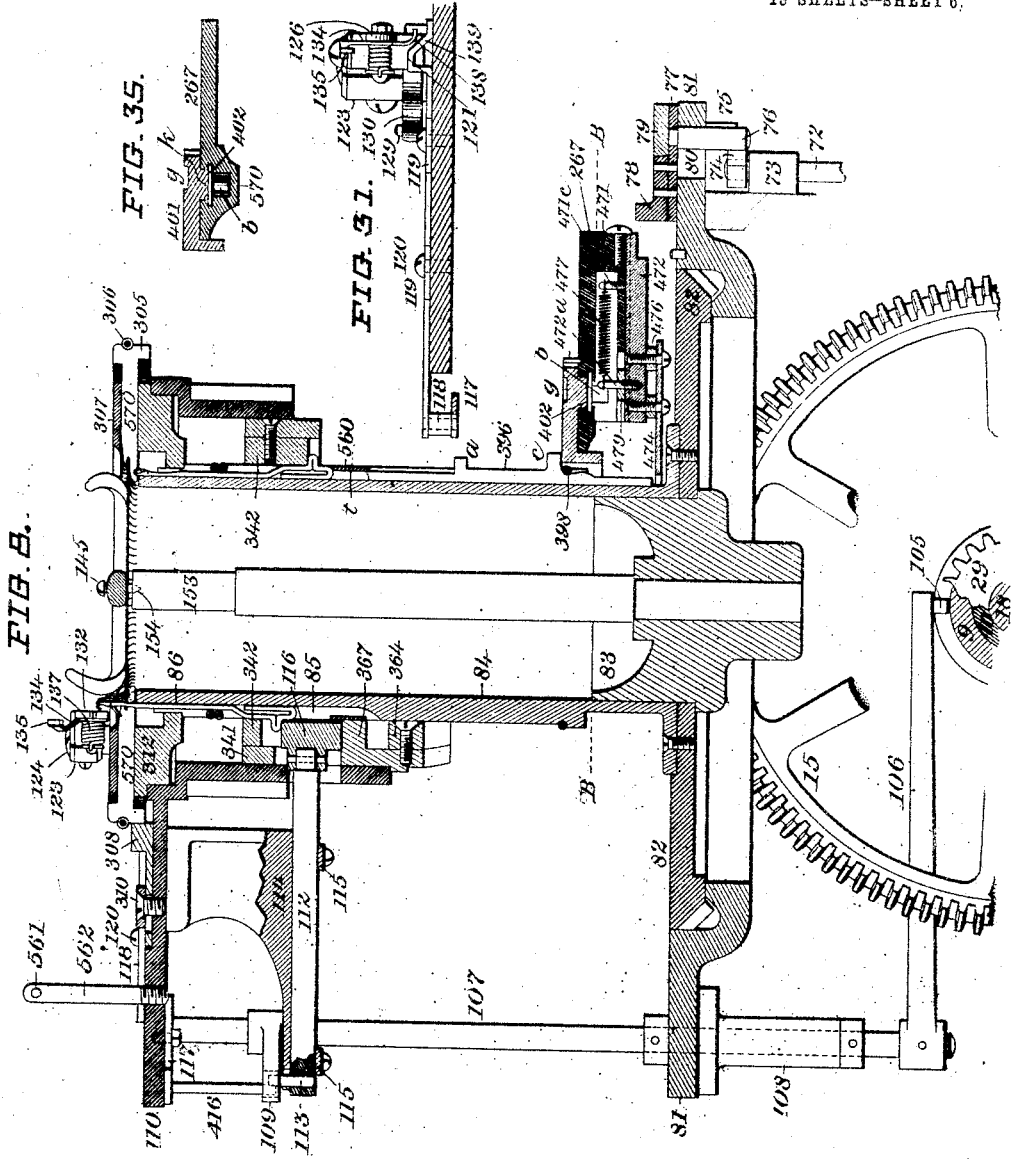

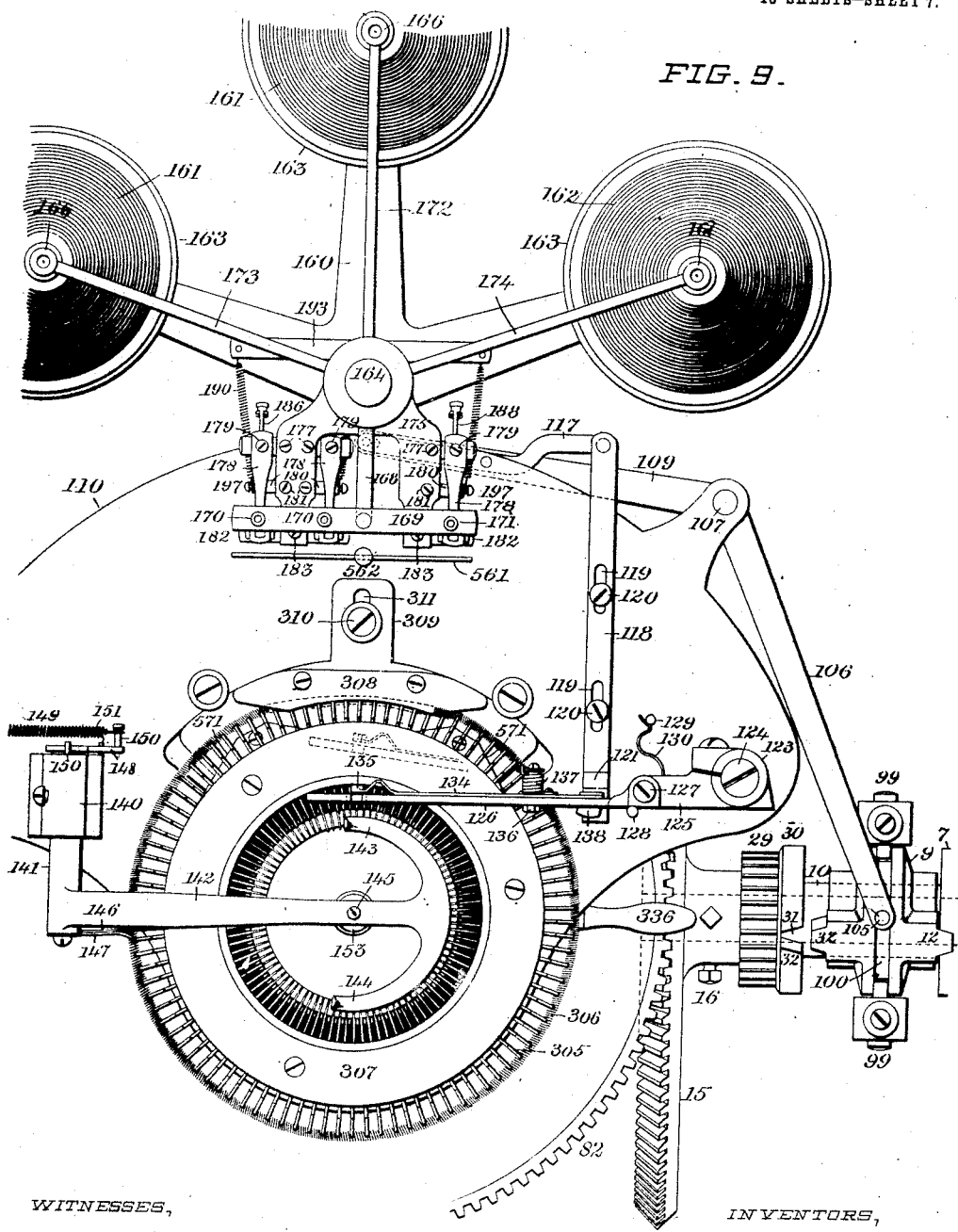

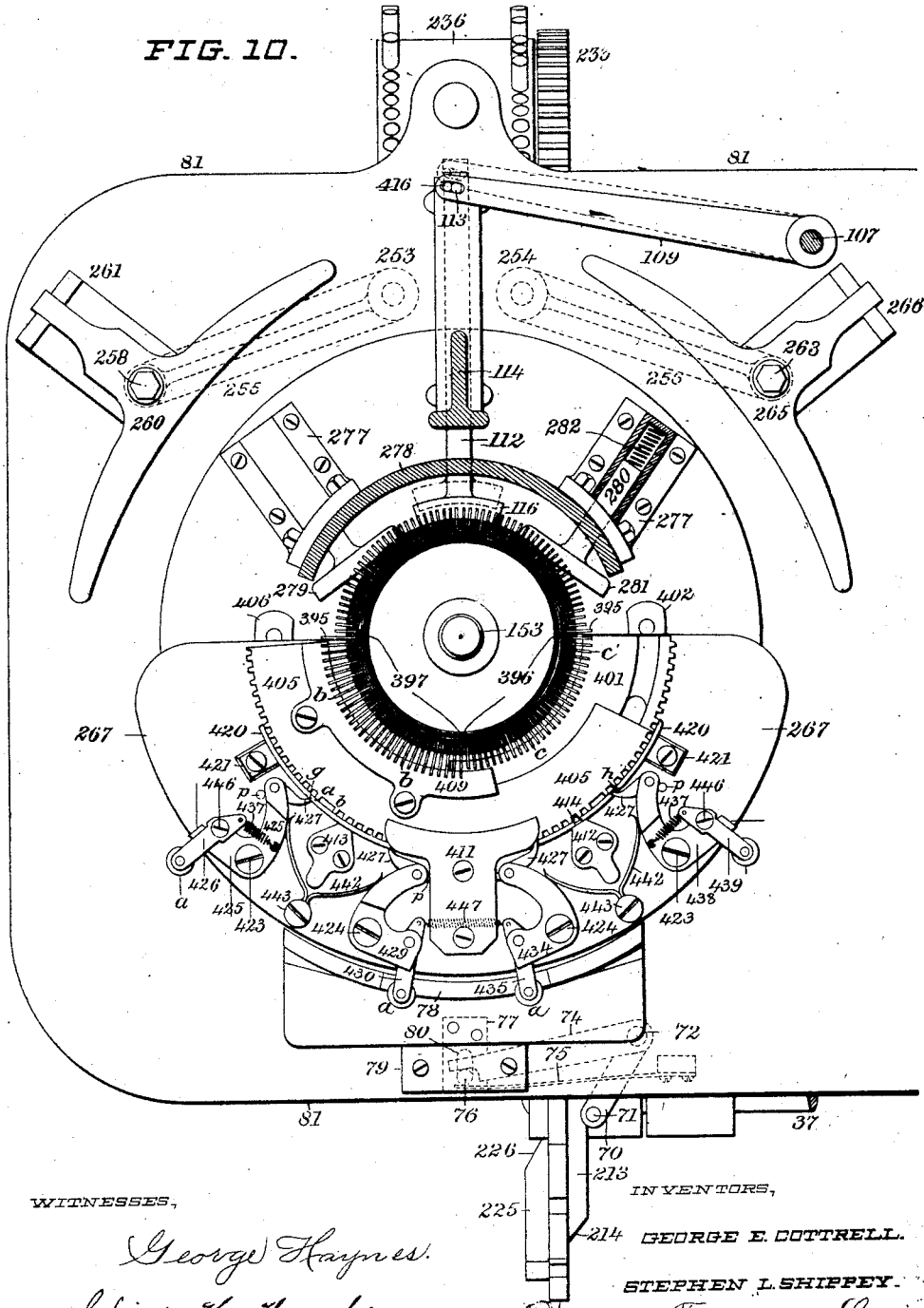

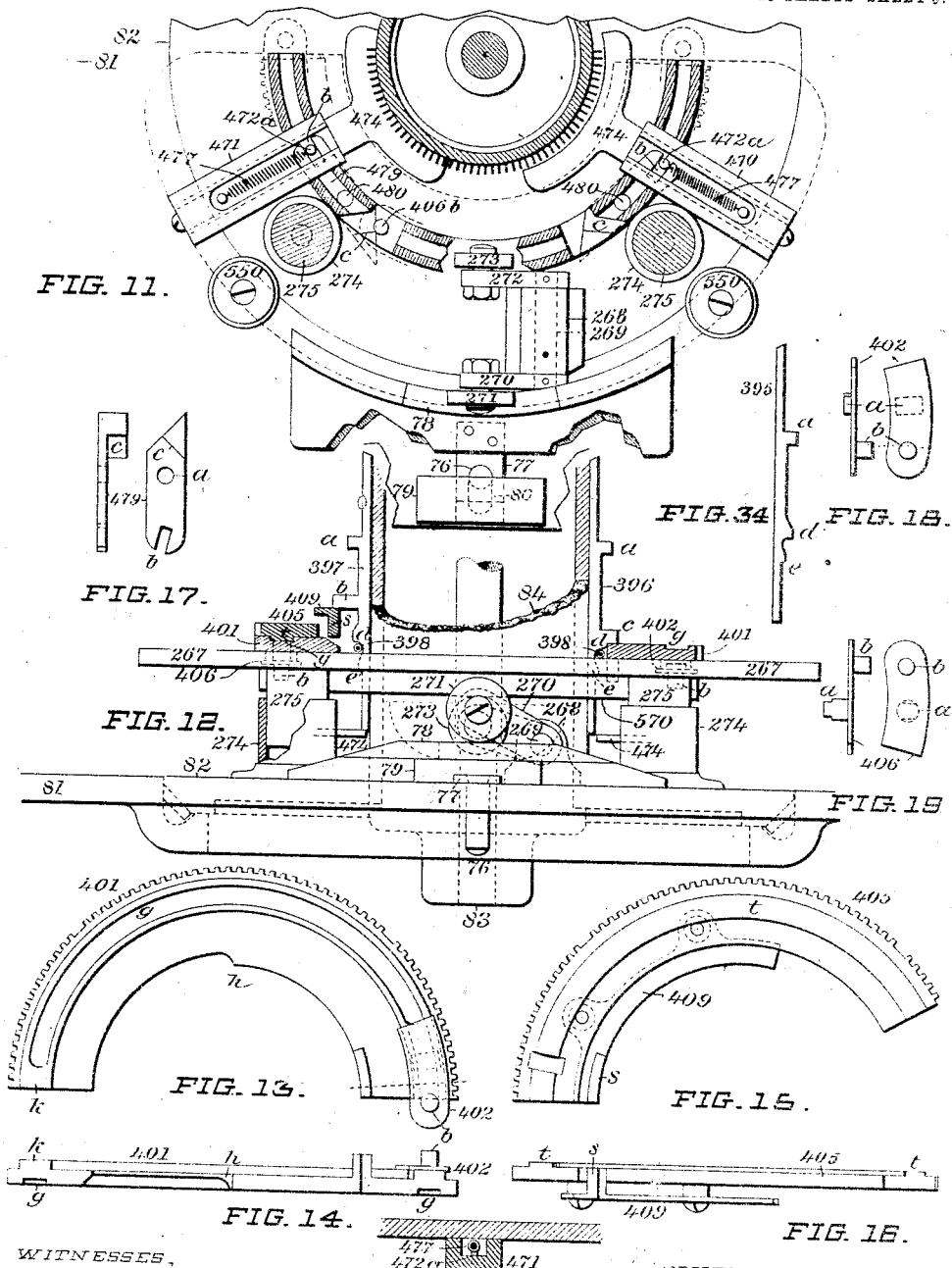

G. E. COTTRELL & S. L. SHIPPEY.
MACHINE FOR KNITTING STOCKINGS.
APPLICATION FILED SEPT. 10, 1907.

1,034,346.

Patented July 30, 1912.
13 SHEETS—SHEET 10.

WITNESSES,
George Haynes.
Charles H. Houghton.

INVENTORS,
GEORGE E. COTTRELL.
STEPHEN L. SHIPPEY.
BY Franklin Scott.
ATTORNEY.

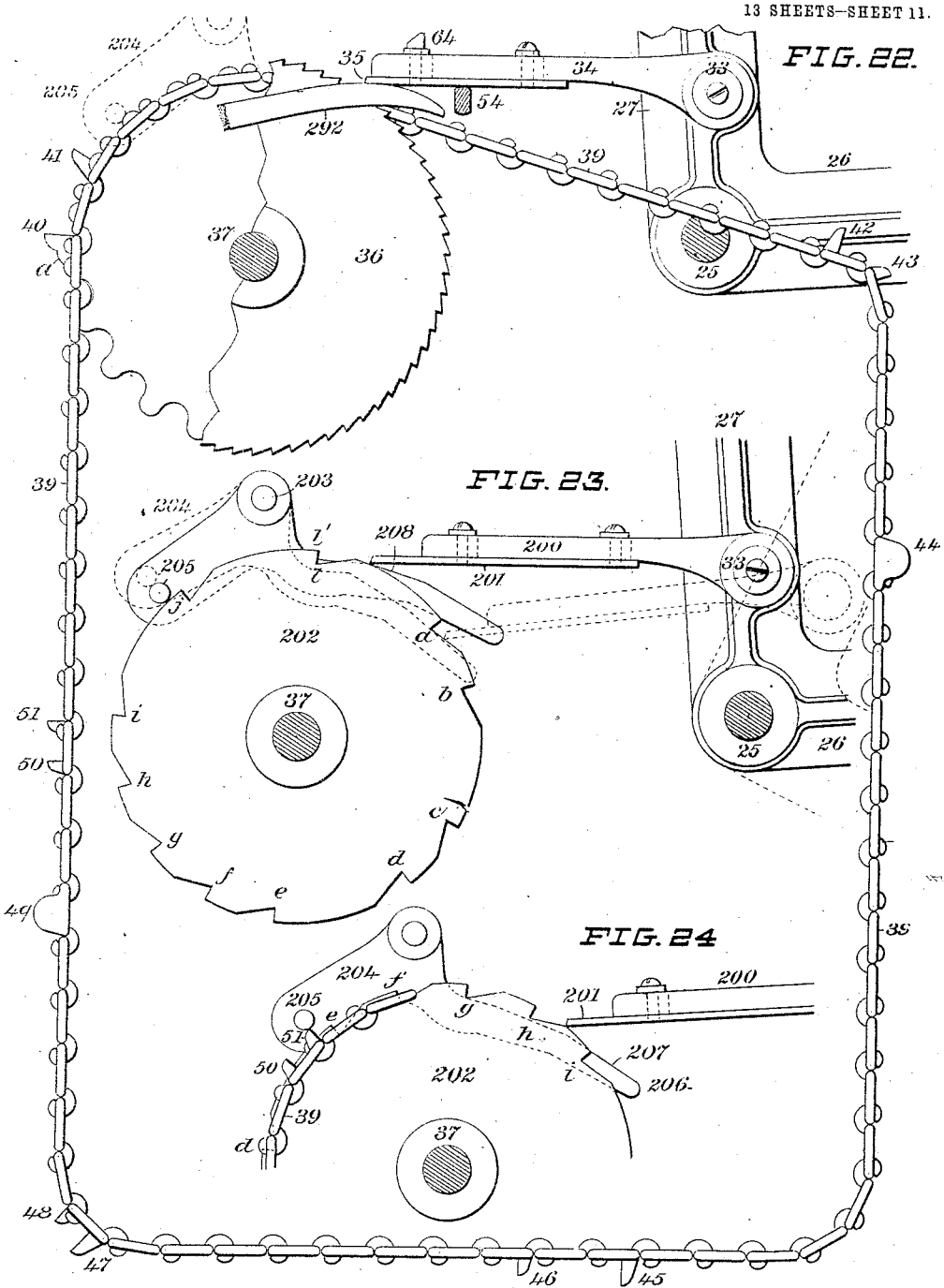

G. E. COTTRELL & S. L. SHIPPEY.
MACHINE FOR KNITTING STOCKINGS.
APPLICATION FILED SEPT. 10, 1907.
1,034,346.
Patented July 30, 1912.
13 SHEETS—SHEET 12.
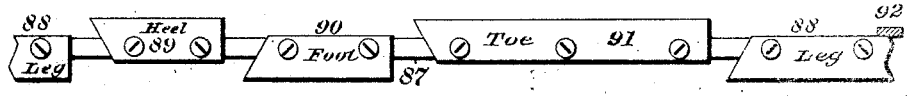
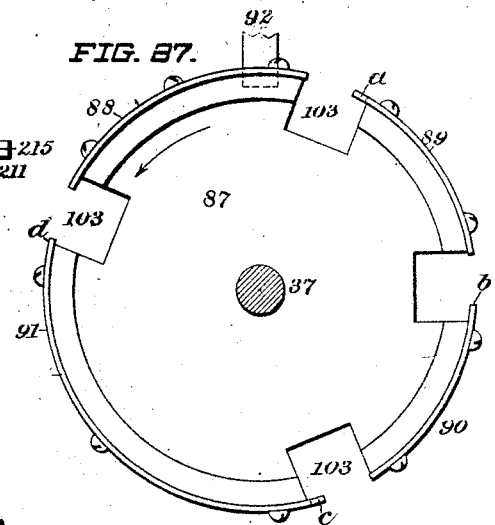
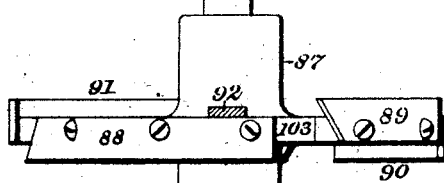
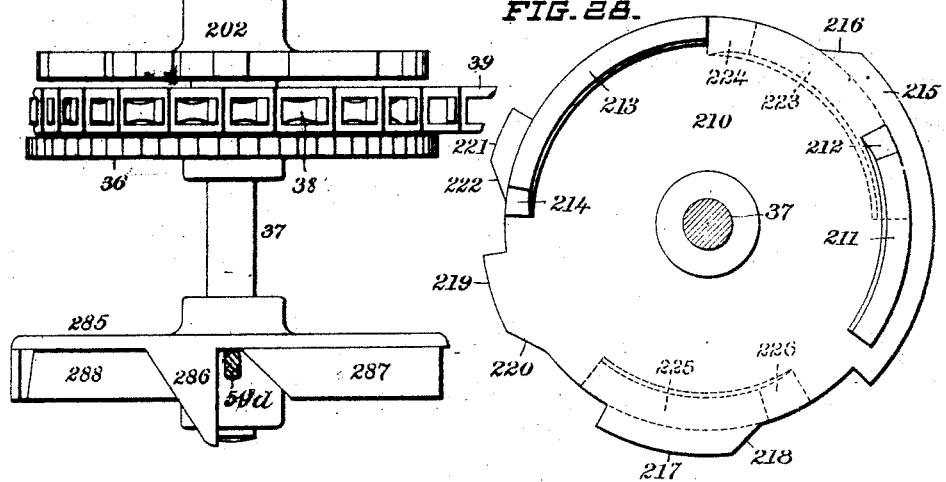
WITNESSES,
George Haynes.
Charles H. Houghton.
INVENTORS,
GEORGE E. COTTRELL.
STEPHEN L. SHIPPEY.
BY Franklin Scott
ATTORNEY

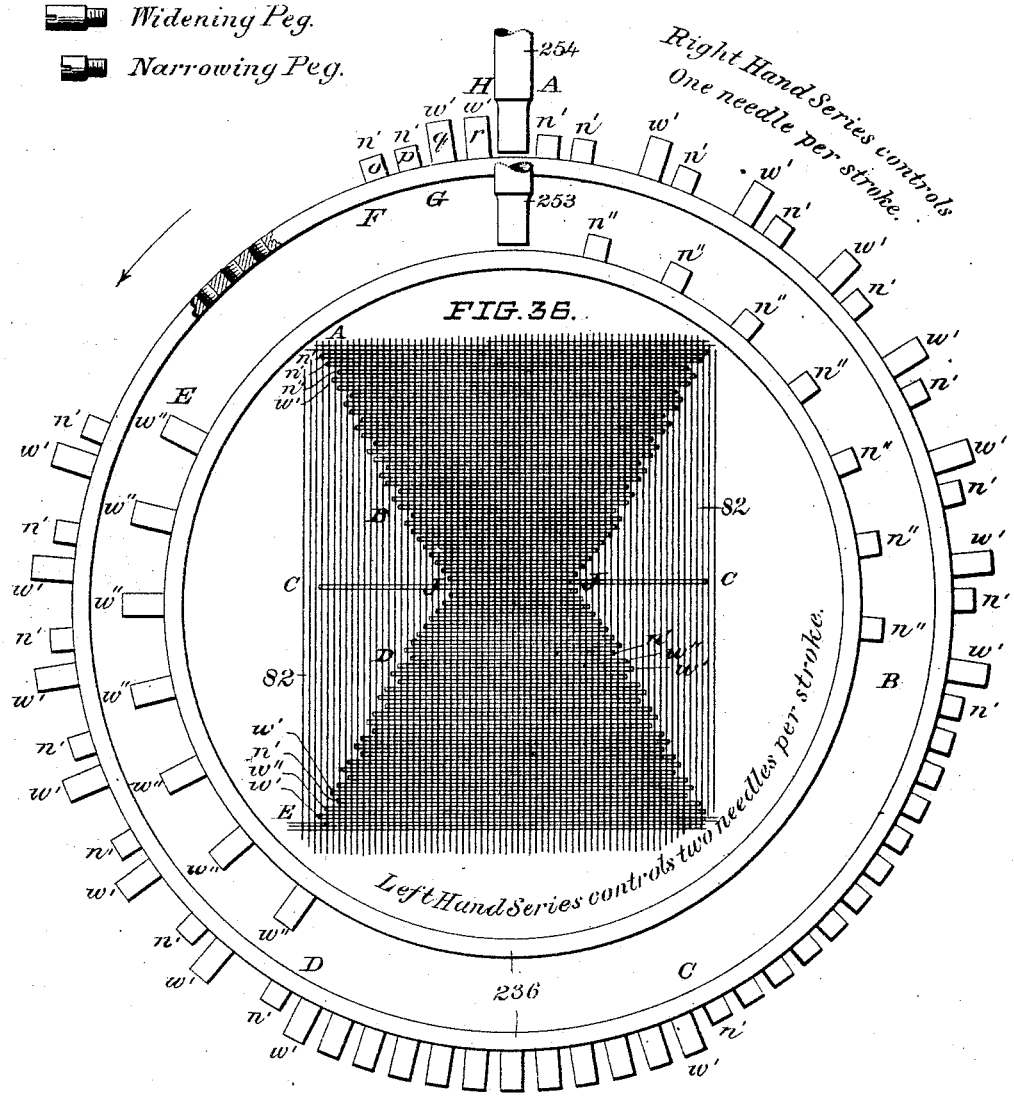

UNITED STATES PATENT OFFICE.

GEORGE E. COTTRELL, OF NORTHFIELD, AND STEPHEN L. SHIPPEY, OF BENNINGTON, VERMONT, ASSIGNORS TO VERMONT HOSIERY AND MACHINERY COMPANY, OF NORTHFIELD, VERMONT, A CORPORATION OF VERMONT.

MACHINE FOR KNITTING STOCKINGS.

1,034,346.   Specification of Letters Patent.   Patented July 30, 1912.

Application filed September 10, 1907. Serial No. 392,120½.

*To all whom it may concern:*

Be it known that we, GEORGE E. COTTRELL, of Northfield, in the county of Washington and State of Vermont, and STEPHEN L. SHIPPEY, of the village of Bennington, in the county of Bennington and State of Vermont, have jointly invented certain Improvements in Machines for Knitting Stockings; and we hereby declare that the following is a full, clear, and accurate description of the same, reference being made to the accompanying drawings, illustrative of our invention, which drawings form a part of this specification.

The machine forming the subject-matter of this invention is designed for knitting half hose of the character described in United States Letters Patent No. 271.338, granted to Frank Lasher, dated January 30, 1883, and known to the trade under the name of "Lasherhose"; and it embodies certain additions and improvements upon the machine designed for knitting that stocking patented to Frank Lasher and Charles S. Beach, by United States Letters Patent No. 632,872, dated September 12th 1899. In carrying out our invention we have utilized some of the actuating devices shown in United States Letters Patent to Joshua D. Hemphill, No. 629,503, dated July 25, 1899. Our invention is adapted to knit supplemental courses of stitches into the heel in the process of automatically fashioning the same to secure greater fullness as shown in said Lasher patent, and it also has improved devices for producing what is known as "plated work" in which two varieties of yarn are so combined and manipulated in the knitting that one variety shows on the inside and the other on the outside of the stocking.

The invention resides in the invention and adaptation of means whereby substantial parts of the actuating mechanism of the latter machine have been rendered available to drive the knitting and fashioning apparatus of the former machine. As these two groups of actuating and fashioning devices in the respective machines were incapable of being operatively combined without radical reorganization of both machines, such re-organization in its breadth and details and as it affects or qualifies the design or mode of operation of the original mechanism, forms the principal part of the invention.

Among the important features of novelty are a new design for the pattern wheel which controls the operation of the fashioning apparatus and the parts connected therewith, the devices for handling the plating thread as well as the means for handling the splicing thread including the tension and takeup devices. Novel changes in the relative positions of certain of the operative parts, and radical changes from vertical to horizontal and from horizontal to vertical positions and movements of many parts connected with the fashioning apparatus have contributed to simplicity and efficiency of the machine. These and other modifications and improvements have materially reduced the cost of these machines below the cost of prior machines for making the said Lasher stocking, and have greatly increased their production.

The accompanying drawings fully illustrate our invention wherein—

Figure 3:
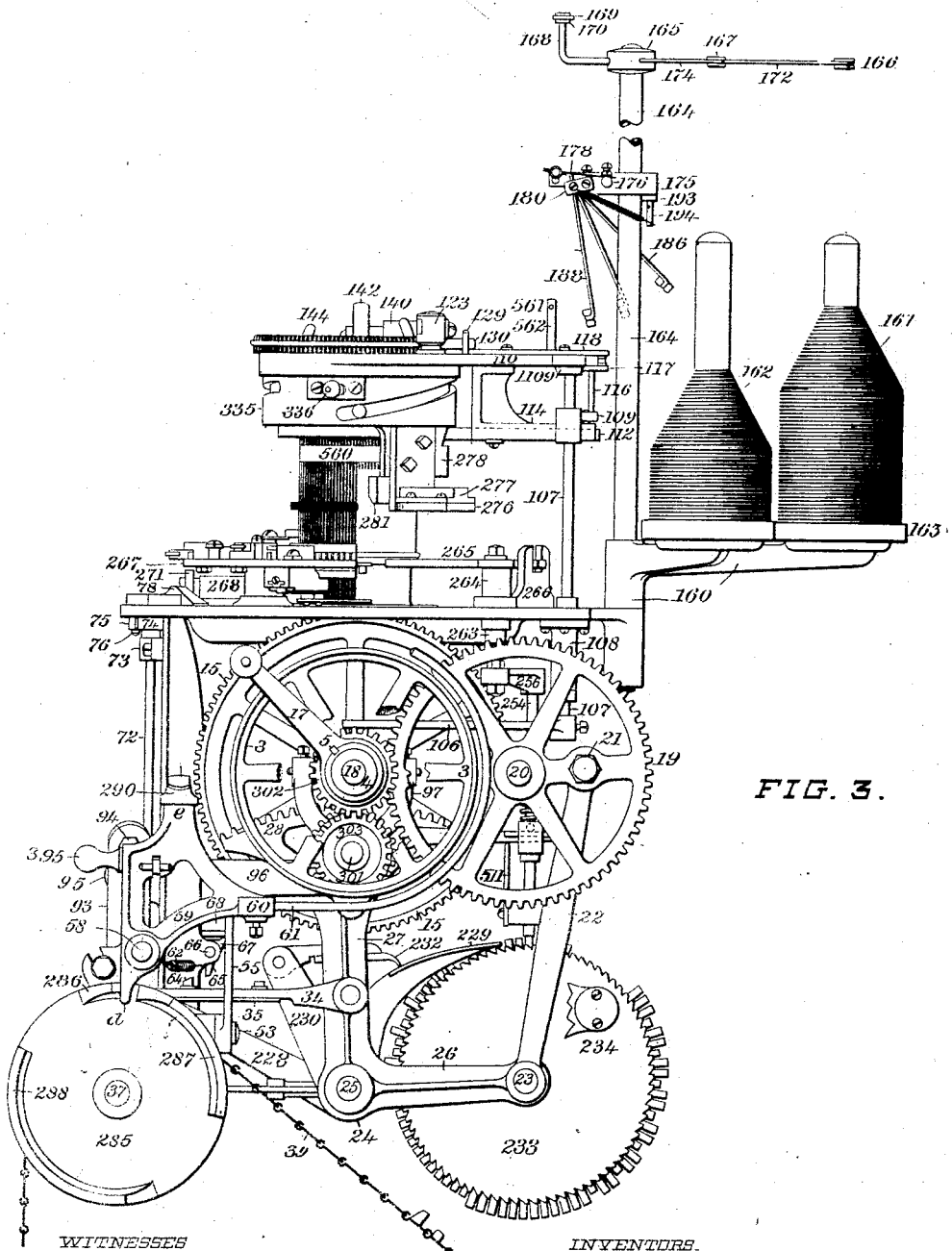
Figure 4:
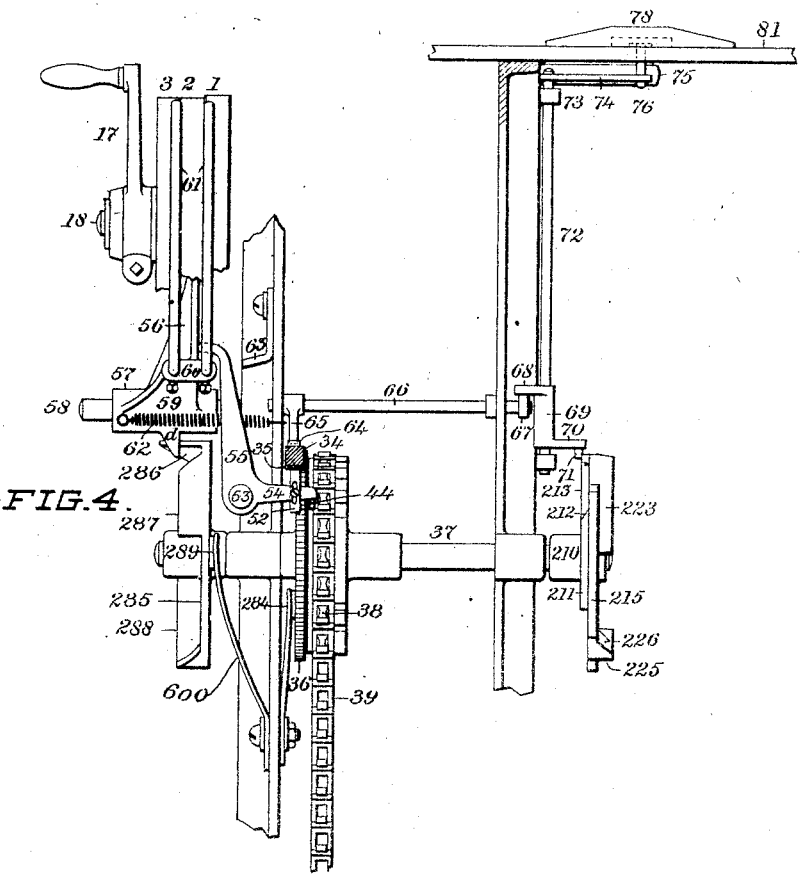
Figure 5:
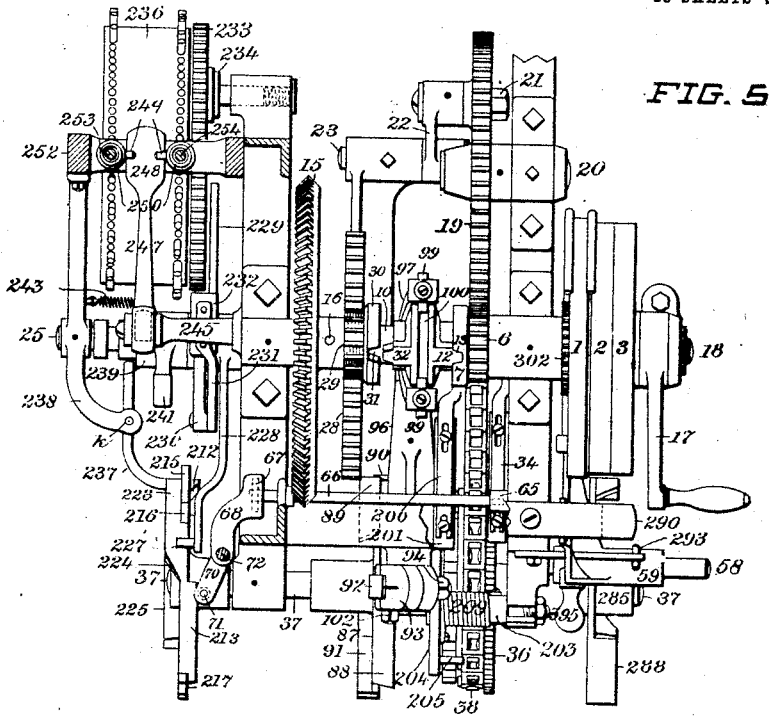
Figure 7:
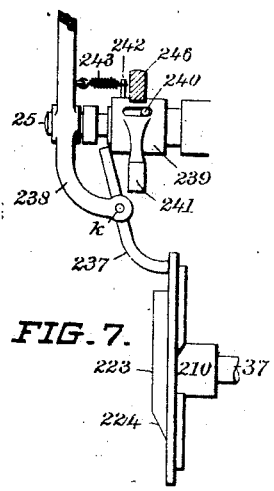
Figure 6:
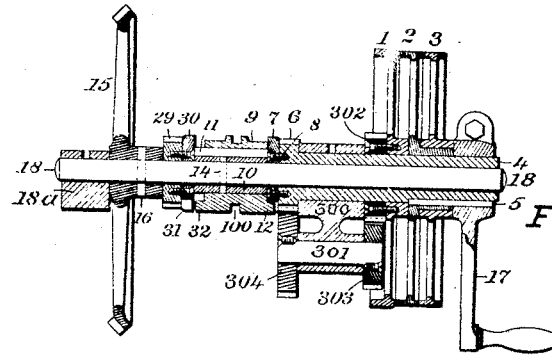
Figure 20:
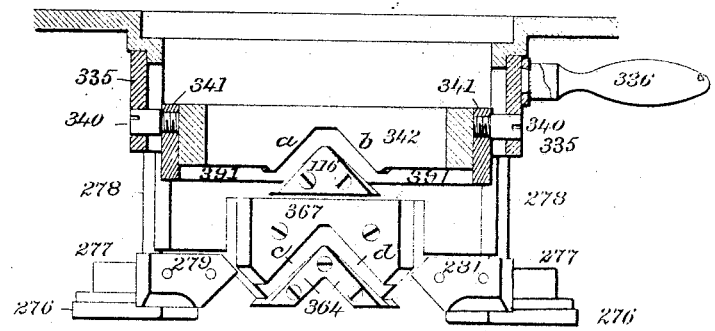
Figure 21:
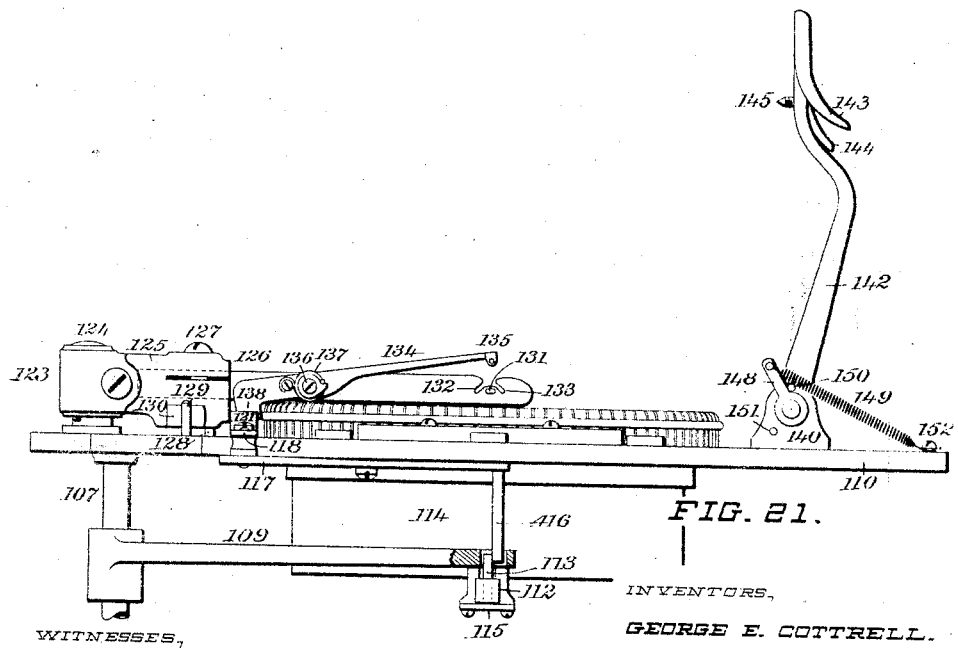

Figure 1 shows a front elevation of the machine. Fig. 2 is an elevation of the left side of the machine. Fig. 3 is a similar elevation of the right side of the machine. Fig. 4 is a rear elevation of the belt shifting devices. Fig. 5 is a plan view of the parts lying below the under side of the main table 81. Fig. 6 is a vertical axial section through the driving pulleys, main driving gear and parts employed for changing speed, and shifting from rotary to reciprocatory motion when the fashioning apparatus is thrown into action. Fig. 7 is a plan detail of the devices for throwing into and out of operative position the crescent cams which govern the movements of the fashioning racks. Fig. 8 is a vertical axial section through the needle cylinder and adjacent parts taken on a fore and aft plane. Fig. 9 is a top plan of the machine. Fig. 10 is a horizontal plan view of those parts below the upper table principally concerned in the heel-fashioning process. Fig. 11 is a horizontal transverse section taken on the plane B, B, of Fig. 8, and shows in part the mechanism for operating the jack-lifting slides. Fig. 11$^a$ is a vertical, transverse section through the stem of one of the jack-lifting slides and of the socket in which it works. Fig. 12 is a front view of the means for elevating the lifting plate 267. Figs. 13 and 14 are respectively inverted plan and rear edge views of the lower fashioning rack. Figs. 15 and 16 are corresponding views of the upper fashioning rack. Fig. 17 shows a face and edge view of one of the pick-up levers which throw the jack-lifting slides into and out of action. Fig. 18 is a plan and edge view of the rack-plate which is attached to the rack 401 to throw the right hand jack-lifter into operative position. Fig. 19 is a corresponding view of a companion piece which performs a like function with the left jack-lifter. Fig. 20 is an inside view of the needle-actuating cams. Fig. 21 is a rear elevation of the thread-carrying devices. Fig. 22 is a side elevation of a governing chain and of the devices for carrying and propelling it. Fig. 23 is a side elevation of the ratchet, pawl and guard by which the rotation of the cam shaft is regulated. Fig. 24 is a similar view of the same parts in a different position. Fig. 25 is a plan view of the cam shaft and its appurtenances. Fig. 26 is an extended view of the edge of the rotary clutch-cam 87 somewhat shortened. Fig. 27 is a side view of the rotary cam which throws a clutch to convert the continuous rotary motion of the needle cylinder into reciprocatory motion. Fig. 28 is a side view of a rotary disk 210 having numerous cams from which various movements are initiated or stopped, which cam for convenience is called the switch-wheel. Fig. 29 is a diagrammatic view of the left side of the pattern wheel, otherwise shown in Fig. 2. Here the two rows of pegs are shown on circles of different diameters for the purpose of relieving the appearance of confusion of the front with the rear circle of pegs. Fig. 30 is a side view of the rotary clutch cam and fork for throwing the clutch on the driving shaft. Fig. 31 is an end view of the yarn-carrying guides showing the means provided for operating the splicing-thread guide. Fig. 32 is a plan view of the tension devices and Fig. 33 is an edge view of the same parts. Fig. 34 is a view of one of the jacks used in running in the diagonal heel seam. Fig. 35 is a radial vertical cross-section through the fashioning platform and the under fashioning rack. Fig. 36 is a diagram of the fashioned parts of the heel of a stocking as they would appear unfolded, and also shows the interspersal of the supplemental courses of stitches in the rear and sole parts of the heel.

*Explanation of lettering on the drawings.*—On account of the complex nature of the details of the various parts of the machine the practice has been followed of giving an element a number and its characteristics or details of form, shape etc., a small letter irrespective of its remoteness from the numeral. Thus, in Fig. 12, the jacks 396 and 397 have their details of form respectively designated, "a," "c," "d," "e," and "a," "b," "d," "e." These details will be referred to in the description by their letters coupled with the number of the piece on which they appear, thus: "396ᶜ," "397ᵇ," etc.

Where it is desired to refer to a part as shown in a particular figure of the drawings the practice has been pursued of referring to the part thus:—"260, (10)," which refers to the crescent cam 260 as seen in Fig. 10.

*The driving and speed-changing apparatus.* (Figs. 2, 3. 5, 6, 11, 23, and 30.)—The driving gear of this machine consists of such a combination of elements that both continuous and reciprocating rotary motion may be imparted to the knitting cylinder to effect continuous circular knitting, as in the formation of a leg or foot of a stocking, or rotary reciprocating motion as in shaping and knitting the heel or toe. Comprised in the driving gear are provisions for continuous high-speed operation for straight tubular knitting, and for reciprocating low-speed for fashioning, and a clutch-coupling for shifting from one operation to the other.

Referring to Fig. 6, portions of the frame appear at 18ᵃ and 300, which afford bearings for the main driving shaft 18. To this shaft the sleeve 10 and the gear 15, which drives the needle cylinder, are irrevolubly fastened and always rotate or reciprocate with the shaft. Sleeve 10 is fitted with a feather 11 upon which a clutch coupling 9 slides. This shaft carries a pinion gear 6, the hub of which is elongated so as to constitute a hollow shaft 4, which finds bearing in the bracket 300 of the frame. The slow-driving pulley 2 and a hand crank 17, are attached to this hub by the key 5 and always rotate therewith. On hub 4 the loose pulley 3 is carried, to which the driving belt is shipped to stop the machine at the finish of the stocking. The main fast-driving pulley 1 and attached gear 302 are revolubly mounted on hub 4, gear 302 meshing with a smaller gear 303 on a short counter-shaft 301 carried in the bracket 300 on the opposite end of which is the gear 304 which meshes with the aforesaid pinion 6 which is smaller than gear 304. By means of these differential intermediate gears 303 and 304 it is plain that gear 6 will revolve at a rate of speed higher than pulley 1. Pinion 6 carries a flange 7 which is notched, at 13, (5), to receive the tooth 12 of the coupling 9, which slides on the feather 11 of sleeve 10 which is fixed to shaft 18 by pin 14, (6), so that it must revolve therewith. When tooth 12 and the notched flange 7 are engaged high speed will be transmitted from pulley 1 directly to the needle cylinder through gears 302, 303, 304, 6, flange 7 coupling 9, sleeve 10 shaft 18, bevel gear 15 and bevel gear 82, (8 and 11), which is attached to the needle cylinder.

The reciprocating motion of the needle cylinder is effected as follows:—The slow-speed pulley 2 is attached to hub 4 of gear 6 and revolves therewith. Gear 6 meshes with a large gear 19, (5), pivoted on stud 20, which is fitted with a crank wrist 21 with which pitman 22 is connected. At its lower end this pitman connects with arm 26 of the elbow lever 24 which oscillates on pivot 25 of which the upper arm terminates in a toothed sector 28, (2) that meshes with a pinion gear 29 that is loosely mounted on shaft 18, (6). Gear 29 has a notched flange like pinion 6 with which the clutch coupling 9 can engage by means of the tooth 32 entering notch 31, (6). Thus when coupling 9 is shifted from an engagement with gear 6 for continuous high-speed knitting to an engagement with pinion 29 a slower rotary reciprocating movement will be imparted to the needle cylinder through the following train of element:—Pulley 2 will drive hub 4 and gear 6 by virtue of spline 5. Gear 6 meshing with gear 19 will impart an oscillating motion to the sector gear 28 through pitman 22 connecting with arm 26 of lever 24, and the toothed sector 28 as it reciprocates will impart a like motion to the pinion 29, shaft 18, bevel gears 15 and 82, and to the needle cylinder 84. Hence, to shift from high to low speed, it is only necessary to shift the belt from pulley 1 to pulley 2, but to shift from continuous to reciprocating knitting or vice versa, the clutch coupling 9 must be shifted.

It will be noticed that the fast driving pulley 1 is slightly larger than the slow driver 2, so that its edge adjacent to the rim of pulley 2 is beveled away, thus presenting to the edge of the belt in process of shifting a slightly elevated shoulder. As the tendency of a belt in operation is to climb to the highest periphery of the pulley face, this shoulder invites to a prompt shift of the belt from the smaller to the larger pulley, a result of importance when it is apparent that the change of movement should be instantaneous.

The provisions for switching the clutch coupling 9 between the gears 6 and 29 to shift from continuous circular to rotary reciprocating knitting, consist of the clutch fork 97 fitted with pins 99, 99, which lie in the groove 100 of the coupling, and is attached to the rockshaft 95, (1). This rockshaft carries at its outer end an actuating arm 93, clamped thereon by the clamp screw 94, and its lower end is fitted with jaws 101, 101, which take in the switch-blade 92 and are firmly clamped thereon by the clamping screw 102. Directly beneath this rockshaft is the wheel 87, (30), which has four recesses 103 in its periphery through which the switch blade can swing when they are rotated into its path. On the periphery of the disk of this wheel are attached four switch cams 88, 89, 90 and 91, the front end of each of which is beveled as shown in the diagram Fig. 26. The lateral edges of these cams project normally a little beyond the location of the switch blade which in practice bears against or contacts with the outer edge of some one of these cams at all times except when crossing through the gaps 103 from one side of the wheel to the other. If the blade 92 is bearing against the inside edge of any switch cam and the wheel be advanced until the beveled end of the following cam impinges against the blade, its beveled end will cause the blade to be forced sidewise through the gap 103 until the inside edge of the cam passes the blade, leaving it to ride in contact with the inner edge of that cam until another following cam forces it back through gap 103 to the opposite side of the wheel. These oscillations of the blade 92 alternately throw the coupling clutch 9, into and out of engagement with the flange pulleys 6 and 29 respectively as the requirements of the knitting process demand. The provisions for insuring that the clutch teeth 12 and 32 shall always register with the notches 31 and 13 in the members 30 and 7 respectively, when the time arrives to shift the clutch member 9, are as follows:—The clutch-shifting wheel 87 (25, 27), has the four gaps 103, through which the switch blade 92 can swing, and the clutch member 9 cannot be switched from an engagement on one side to an engagement on the other by any other means than the oscillation of lever 93 (1) which cannot be swung when blade 92 bears against the inner edge of any of the cams 88, 89, 90 or 91, which it always does except when it is swinging through one of the gaps 103. These cams are so proportioned adjusted and timed in their contact with blade 92 and the time of the various switch movements concurrent therewith that one of gaps 103 comes opposite blade 92 at no other time than when the pawl stroke occurs which shifts all the mechanism from rotary to reciprocating knitting or vice versa. The cam shaft 37, is rotated by a pawl finger 201 on the arm 200 (23), which is pivoted at 33 on the oscillating arm 27 of the bell crank which carries the sector gear 28, and it works on the ratchet 202 attached to shaft 37.

*The belt-controlling devices.* (Figs. 1, 3, 4, 5 and 22.)—To control the driving belt, not shown, a belt shifter 59, is provided which is fitted with two belt guides 61, (3, 4). This shifter slides on a stud 58 and may be operated by hand by the handle 395. When it is slid to the limit of its throw on the stud to the right it throws the belt onto the idle pulley 3. When so thrown, the arm c, will stand out where the spring latch 290 can snap down behind it and thus hold the shifter locked with the belt on the idle pulley and the machine stopped. A pin 293, limits the outer sliding movement of the shifter. An arm d, depends from the under side of this shifter which is held in contact with the shifter cam wheel 285 by a retractile spring 62, (4), attached to the main frame of the machine. The shifter cam wheel 285 is carried on the end of the cam shaft 37, and is provided with the three cams 286, 287 and 288, (3). When the wheel is in position where the arm $59^d$ bears against the side of the wheel disk, as seen in Fig. 3, the shifter will stand with the belt on the high-speed pulley 1, and when it is forced outwardly so that this arm rides on the outside of the cams 287 or 288, the belt will run on the slow-speed pulley 2. When cam 286 engages arm $59^d$, it forces it far enough to the right to carry arm $59^e$, out beyond latch 290 which then springs down and locks the shifter with the belt on the loose pulley 3, thus stopping the machine.

The means provided for throwing the belt from pulley 1 onto pulley 2, which would be resisted by the strain of spring 62, (4), consists of a bell crank 55 pivoted on the main frame, the long arm of which bears against the backside of the shifter 59, as seen in Figs. 1 and 4, and the short arm lies across the path of two lifting lugs 44 or 49 on the chain 39, (22), either of which by passing under the arm 54 of the bell crank will turn it so that arm 55 will press the shifter in the direction to throw the belt from pulley 1 to pulley 2. These lugs come into action at the commencement of the reciprocating knitting of the heel and toe respectively, as will be explained elsewhere. Immediately upon the shifting of the belt from pulley 1 to pulley 2, the cam wheel 285 is advanced sufficiently to carry one or the other of the cams 287 or 288 in behind the arm $59^d$, so that under the stress of spring 62 it will be held in close contact with one of those cams with the belt on pulley 2. At the close of the knitting of a heel or toe as the case may be, the cam wheel will be advanced a step, which will carry the heel of the cam out from under the arm $59^d$, which will then under the stress of spring 62 be drawn back to its original position, carrying the belt with it onto the high speed pulley 1. Thus it appears that under the influence of the lugs 44 and 49 the bell crank 55 throws the belt from the high-speed pulley 1 to the low-speed pulley 2 twice in knitting a stocking, while the reverse shifts are effected by the draft of the spring 62 on the belt shifter when the cams 287 and 288 run out of contact with the arm $59^d$ of the shifter; the bell crank acting at the commencement of a heel or toe and the spring at the finish of those parts.

*The chain and its functions.* (Figs. 1, 2, 3, 4, 22, 23 and 24.)—The means provided for bringing into and throwing out of action the several groups of coöperative mechanism for changing from continuous rotary to rotary reciprocating motion of the needle cylinder and its attachments, for fashioning and knitting the heel and toe of a stocking, and for stopping the machine at its completion, are governed in the order of their occurrence, and in some respects the extent and duration of their action by the chain 39, (22, 23, 24,), of which all the links are separable, which chain makes one complete circuit of movement in knitting a stocking. It is fitted with a set of lugs on each of its margins which, as they are successively brought into position to actuate the devices with which they coöperate, effect all the shifts necessary to accomplish the change from continuous to reciprocating knitting and vice versa.

The lugs on the inner margin of the chain co-act with a pin 205 upon the pawl guard 204, (1), and as they pass under this pin they successively raise it and turn the guard on its pivot 203, (23). A spiral spring 209, (1), is coiled on the stud 203, one end of which is fast and the other end is connected with the guard 204, so that its stress will act upon the guard to hold the pin 205 down against the periphery of a sprocket wheel 38, which carries the chain. A fine ratchet 36 is attached to the sprocket wheel and both are pivoted loosely on the shaft 37. This shaft carries fixedly mounted upon it the belt-shifting cam wheel 285, the ratchet 202 by which it is driven, the clutch-shifting cam 87, and the cam 210 which carries provisions for throwing into and out of action the fashioning mechanism for shaping and knitting the heel and toe. The chain ratchet 36 is propelled by a pawl 34 which is pivoted on a stud 33 which projects from the sector arm 27 of the elbow lever which carries the sector gear 29. Another pawl 200 is pivoted on the same stud which imparts movement to the shaft 37 and its dependencies through the ratchet 202. Pawl 34 is provided with an adjustable finger 35 which rides on a stationary guard 292 so that it will propel the ratchet but one tooth at a time. The only function of this pawl and ratchet is to advance the chain and the parts are so proportioned that three strokes of the pawl will advance the chain one link. The other pawl 200, is also fitted with an adjustable finger 201 which when not in service rides on the upper side of the rear arm 206 of the pawl guard 204. This pawl guard coöperates with the chain and the finger 201 as follows:—When the intervals between successive lugs, as for instance, between 41 and 42 of the chain are passing the guard, the pin 205 and the front arm of which it is an adjunct, will be forced down against the periphery of the ratchet 202 by the action of the spring 209 and its rear arm 206 will be correspondingly elevated high enough to lift the pawl finger 201, which rides upon it, out of operative contact with the ratchet 202, and the vibrations of the sector lever will only produce idle strokes of the pawl 201 upon the edge 207 of the guard arm 206, and the parts will bear to each other the relation shown in full lines in Fig. 25. But when a short lug passes the pin 205, as shown in Fig. 24, and by raising it turns the guard on its stud, its rear arm 206 will be depressed low enough to permit the finger 201 to catch one tooth of ratchet 202, and if a high lug passes under pin 205 it will depress the guard arm 206 low enough to permit the finger 201, on its back stroke to catch behind a long ratchet tooth or two short teeth as seen in dotted lines in Fig. 23.

The lug 44, (4, 22,), which projects from the outside margin of the chain, coöperates with the arm 54 of the bell-crank 55 to shift the belt onto the pulley 2 at the commencement of a heel, and lug 49 similarly coöperates at the commencement of a toe, as has elsewhere been explained. But the arm 54 has an upward attachment 52 which lies directly under the pawl finger 35 of the arm 34. When either lug 44 or 49 passes under the arm 54 it forces part 52 up against finger 35, thereby pushing dog 64, (3), up in front of arm 65, which projects from rockshaft 66, so that the back stroke of pawl 34 will cause the dog to throw arm 65 and rotate shaft 66. At the other end of shaft 66 is a lifter 67, seen best in Fig. 2, which when turned will elevate arm 68 attached to rock-shaft 72 so that pin 71, which depends from arm 70, can swing into the path of one or the other of the cams 211 or 213, (4), of the cam-wheel 210, preparatory to one of those cams advancing and by engaging pin 71 rocking the shaft 72 and by swinging the lever 74, attached thereto, throwing out of position the lifting cam 78, which had been put into position by the previous turn of shaft 72 to coöperate with the jack-lifting devices.

The several operations initiated by the successive passage of the lugs on the chain under the pawl guard 204 will be fully understood by reference to Figs 2, 3, 8, 9, 22–28 inclusive. These figures represent the relation of the various parts as they stand at the commencement of the top of the leg of a stocking. Referring to Fig. 22, it will be seen that lug 41, which is the lug that stops the machine, has just passed pin 205 of the pawl guard. Pawl 35 is in action on the fine ratchet and pawl 201 is riding idly on the top of the arm 206 of the pawl guard. These relations subsist until lug 44 lifts pawl 35 and dog 64 engages the arm 65 on rockshaft 66, and by swinging it throws cam 78 into position to be ready to start the heel. On the next stroke of the sector arm 27 pawl 35 will advance the chain ratchet and sprocket one tooth which will carry high lug 42 under the guard pin 205, and lift it high enough to drop arm 206 to the dotted position seen in Fig. 23. This allows pawl 201, on its back stroke, to drop into the position shown in dotted lines, or where it can catch tooth $a$, of ratchet 202. The next forestroke of this pawl will rotate the ratchet and with it shaft 37 and all its cams from $a$, to the position marked 1' or one-eighth of a revolution of the cam shaft 37. This stroke effects simultaneously the following shifts:— Cam 287 will advance behind $59^d$, and hold the belt shifter out with the belt on the slow speed pulley 2. The cam 89 of the clutch cam wheel 87 will engage the shifting blade 92 and carry it across through gap 103 to the opposite side of cam 89, thus shifting the clutch coupling 9 from its high speed continuous rotary connection to the reciprocating connection. Mechanism connecting with coupling 9 at the same time throws out of action the needle-actuating cams for continuous knitting and throws the splicing thread into position to be drawn into service at once. The advance of the switch wheel 210, (2), rotates cam 215 and thereby lifts pin 227, on lever 228, which drops its opposite arm 229, and lets pawl 232 down into working relation with ratchet 233 which moves the pattern wheel 236, and cam 223 runs out from under lever 237, (5, 7,), which being released, spring 243, which is attached to hub 239, recoils and draws arm 241 into position to coöperate with a bell crank which lifts the crescent cams that govern the movements of the narrowing and widening racks in shaping the heel and toe. Cam 212 will be partially advanced toward its next operative position just in rear of pin 71, and in this condition the machine will be in proper adjustment to commence knitting the heel but not in proper adjustment to resume circular knitting after the heel is completed, as it is essential that the nose of cam 212 be further advanced to take a close position in rear of pin 71, the heel of cam 215 should be advanced to a close position under pin 227, and the heel of cam 287 on the belt shifting wheel 285 should follow close behind arm $59^d$ of the belt shifter, so that at the finish of the heel all these connections may simultaneously be shifted to resume continuous tubular knitting of the foot of the stocking. Therefore, to advance these cams to their appropriate operative positions, the short lug 43 follows along under pin 205, and by turning the pawl guard to the position seen in Fig. 24 allows the pawl finger 201 to catch the short tooth b, and force it to position 1', which supplemental movement advances the nose of cam 212 and the heels of cams 215 and 287 into such positions that the next advance of the ratchet 202 breaks all the heel-fashioning and reciprocating connections and resets the machine to commence knitting the foot by continuous round and round knitting.

The interval in the chain between the lugs 42 and 45, (22), passes the pawl guard while the heel is being knit; when lug 45 reaches the pawl guard in passing it arm 206 drops so that pawl finger 201 catches tooth c, of ratchet 202 and pushes it to 1', which effects the following shifts:—The heel of cam 287 runs by arm d, of the belt-shifter 59, thereby leaving spring 52 free, which, acting, throws the belt onto the high speed pulley 1. Cam 90, advances against the blade 92 and switches it across gap 103, whereby the clutch fork throws the coupling 9 out of its reciprocating connection and into engagement with the continuous driving connection, and also throws into action the needle cam 116, and throws the splicing thread carrier out of action. Cam 212 advances behind pin 71 and forces it around thereby turning shaft 72 which throws lifting cam 78 out of operative connection with the needle-lifting jacks; cam 225, entering behind lever 237 forces arm 241 out of connection with arm 246, thereby leaving spindles 253 and 254 and the crescent cams 260 and 265, which they support, out of action; the heel of cam 215 runs out from under pin 227 which permits lever 228 to drop, thereby lifting arm 229 and with it the pawl 232 which severs its working connection with the pattern wheel ratchet 233 so that the pattern drum 236 will stand still. Thus the working conditions which existed while knitting the leg are restored to knit the foot of the stocking. Following lug 45 is the short lug 46 which produces a short, supplemental stroke of pawl 201 which catches the tooth d, and advances it to 1', thus effecting the same movements as were effected by the lug 43 before described. The knitting of the foot will then proceed until lug 49 engages arm 54 when the belt will be shifted to the slow speed pulley 2, and lifting cam 78 will be thrown into working position precisely as when lug 44 acted upon the same arm, and the lug 47 will operate on the pawl guard 205 with the same results as when acted upon by lug 42, and lug 48 will perform the same functions as were performed by lug 43, that is to say, cam 90 of the clutch wheel will engage blade 92 and throw it across gap 103 and thereby throw into action the reciprocating apparatus and the splicing thread devices and throw out of action the regular needle actuating cam 116. Cam 217, advancing under pin 227 will raise it and through lever 228—229 drop pawl 232 into engagement with ratchet 233 of the pattern wheel. At the same time cam 225 will run out of engagement with lever 237 which will permit spring 243 to throw into action the fashioning apparatus to knit the toe. The effect of the passage of lug 48 on the pawl guard will be to engage the pawl 201 with tooth f, of the ratchet 202 and by its stroke to force that tooth forward to the position 1', after which two strokes of pawl 232 will advance the pattern wheel to a point where pin p, (29), will stand under the spindle 254. Then lug 50 will engage pawl guard 204 with the result that tooth g, will be forced to position 1', when two strokes of pawl 232 will carry pin r, of the pattern wheel under spindle 254. Lug 51 following will cause pawl 201 to catch tooth h, and drive it to 1', and at the same time will carry cam 219 out from under pin 227 which causes arm 228 to drop and arm 229 to rise which puts pawl 232 out of action and leaves pin r, idle standing under spindle 354. During the interval between the passage of lugs 47 and 40ª the toe has been knit. At the finish of the toe the double lug 40 comes into action. This lug has a shoulder 40ª which first encounters pin 205 of the pawl guard and by raising it allows pawl 201 to engage tooth i, and advance it to the position 1'. This advance of shaft 37 carries cam 221 under pin 227 of arm 228, which dropping, arm 229 lifts pawl 332 out of engagement with the pattern ratchet. This stroke puts the pattern wheel out of service during the completion of the process of knitting the stocking, when the lug 40 immediately following, in passing under pin 205, causes pawl 201 to engage tooth j, and force it to the position 1', which rotation of cam shaft 37 with its cams shifts the machine back to continuous knitting by running pawl 288 out of engagement with arm 59ᵈ, which shifts the driving belt to the high speed pulley, cam 91 throws the clutch coupling 9, which takes the splicing thread out of play and throws in the needle-actuating cam 116, cam 213 forces lifting cam 78 out of action, cam 221 runs out from under pin 227 which drops and throws pawl 232 out of action on ratchet 233, thereby stopping the pattern wheel, and the nose 216 of cam 223 throws back lever 237, thereby throwing the fashioning apparatus out of action. From this point a few courses of circular knitting are added to the toe when lug 41 coming into action on the pawl guard lets down pawl 201 where it catches the tooth marked 1, and by forcing it to 1', turns shaft 37 so that cam 286 engages arm 59ᵈ, and in passing it throws the belt shifter to the utmost limit to the right thereby shifting the belt to the idle pulley 3, and thus stops the machine.

*The knitting mechanism.* (Figs. 8, 9, 10, 11, 12, 20 and 34.)—The following parts are concerned in the process of continuous rotary knitting of the leg and foot of the stocking. Referring to Fig. 8 a fore and aft vertical section through the axis of the needle cylinder is shown. The main table of the machine is seen at 81, and has its central portion sunk to form a seat for the bevel gear 82, which is fitted to run accurately therein. This gear is driven by the gear 15 on the main driving shaft. Gear 82 is held in its seat and prevented from rising by the cleats 550, 550, (11). The center of gear 82 is counterbored to form a seat for a flange on the bottom of the needle cylinder 84 which is fastened therein by screws so as to revolve with the gear. A hub 83, (8), is fitted to the bottom of the needle cylinder from the center of which rises a post 153, the upper part of which is reduced in size to leave a shoulder which coöperates in the use of the rib-transferring device, (not shown,), its top being countersunk to receive the point 154 of a screw 145 which acts as a holder of the splicing thread at the finish of the heel of the stocking. By reference to Fig. 8 it will appear that the needle cylinder is provided with two lengths of needle grooves. Those on the left of the figure are cut down only to the point opposite the number 367, and of these there are two less than half the whole number of needles. The remaining grooves are cut down through to the upper sides of the flange at the bottom of the cylinder. A shallow channel is cut on the cylinder at t, as a seat for the supporting band 560. The top edge of this band forms a support for the bottoms of the needles to rest on and serves as a stop to limit their downward drop; it also forms a retaining means for holding in position the tops of the needle lifting jacks. All the long grooves except two are supplied with long jacks which are of two patterns, as shown in Fig. 12. The jacks of each half of the series have their driving shanks a, a, in the same horizontal plane, but their lifting stems b, and c, are in different altitudes to accommodate the devices concerned in elevating them as will elsewhere appear. There is an extra jack 395, at the end of each half of the series which has a stem whereby it may be lifted by the fashioning racks, and is of the form shown in Fig. 34. These jacks are employed only in the process of knitting the heels and toes. The machine is fitted with ordinary latch needles which are all alike. The needle actuating cams are seen in Fig. 20. In continuous rotary knitting the jacks do not come into action and the shanks of the needles run through the needle race 391, which is defined by the lower edge of the annulus 342 which is notched as at a, and b, and the upper edge of the triangular cam 116. This cam is capable of being withdrawn from its operative position so that the shanks of the needles may pass without being raised by it. This is done in reciprocating knitting when the set of needles which is operated by the jacks only are brought into action. In such case the fashioning needles are elevated by the jacks of which the shanks traverse the race c,—d, as defined by the edges of the jack cams 364 and 367. When the jacks are in service cam 116 is withdrawn and if a jack shank enters the lifting slope d, between cams 364 and 367, the needle will be pushed up to take the feed thread. In doing this the needle shank will follow the slope b, between cams 342 and 116, and as the cylinder continues to advance the needle shank will be forced down by the cam slope a, between cams 342 and 116, while at the same time the corresponding jack will be pushed down by the slope c, between the cams 367 and 364.

The mechanism for throwing the needle cam 116 into and out of action is shown in Figs. 8, 9 and 10. A rockshaft 107 is pivoted on the main frame having an arm 106 which through pin 105 connects with clutch coupling 9 and moves with it, and the other, 109, which is slotted at its free end, connects by pin 113, (8), with slide 112 which is carried in a bearing in bracket 114, to the front end of which the needle cam 116 is attached. When the coupling 9 engages gear 6 through flange 7 the cam 116 is in position to act on the needles, and when it is thrown into engagement with the reciprocating gear 29 through flange 30, the needle cam will be withdrawn from its active position and out of the path of the needle driving shanks, and thereafter the needles are lifted by the fashioning jacks only.

*The yarn carrying devices.* (Figs. 1, 3, 8, 9, 21, 31, 32.)—A bracket 160 extends from the rear of the table 81, having provisions for supporting bobbins 163. As many of these may be provided as may be needed. From the bracket 160 a standard 164, is erected which carries at its top radiating from a hub 165, a series of arms 172, 173 and 174, at the end of each of which is an eyelet 166, 166, and 167 respectively. The arm 168 supports a cross-piece 169 fitted with eyelets 170, 170 and 171 to correspond with the eyelets 166, 166, and 167. The yarn from each bobbin is taken upwardly through the eyelet located directly over it, thence to the eyelet in bar 169 corresponding to it, and thence down to the tension devices below. These devices comprise a set for each thread and each set consists of a small cylinder 176, (32), fitted to a bore in the bracket 175 in which it may be rotated and in which it is held fast when adjusted by a set screw 177. On the upper side of the cylinder 176 is attached a flat leaf spring 178, which carries in its free end a small hard steel or vitreous bar, 184. The clips for holding this bar, which may be called a tension bit, are so disposed as to leave the under side of the bit uncovered its entire length so that it may contact throughout its length with a corresponding vitreous bar 182, which is held by a set screw 183, in a hole in the arm of the bracket 175. These bars 182, may be called friction bars, and the pinch between them may be adjusted by rolling the cylinder 176 more or less as desired and then tightening up the set screws 177. The ends of the leaf springs 178, are perforated as at 185, to allow the thread to be passed through them from the eyelet in the bar 169 above them, thence under the bit 184 and over the friction bar 182 down under the horizontal bar 561 and thence to the eye 189 in the end of the swing take-up 186. This take-up is a light rod having its upper end fastened by a screw 197 to a swinging head 180 which is pivoted on the side of the bracket 175. A retractile spring 190, connects this head to a pin 194, which depends from the bar 193, which is attached to the under side of the bracket 175. The stress of this spring is very light and its function is to take up any slack in the running of the yarn from the tension device above it to the point of delivery to the needles. Thus it will be seen that as many kinds of yarn may be used in the knitting of a stocking as there are provisions for handling different threads. From the take-ups the various threads pass to the several devices provided to deliver them to the knitting devices.

The special devices for controlling the delivery of the main thread, the splicing thread and the plating thread to the needles, are illustrated in Figs. 8, 9 and 21. On the top of the table 110 on a stud 124 is pivoted a horizontally swinging guide clamp 125. This clamp is horizontally split as shown in Fig. 21, so as to form two jaws between which the guide blade 126 is firmly clamped and held by the set screw 127. Attached to the clamp is a leaf spring 130, which normally bears against a stud 129, and is so bent that the knuckle near its free end when thrown inside of stud 129 will force the clamp against the stud 128 to determine the correct position of the end of the guide blade 126, in relation to the tops of the needles when in position to take the feed thread. The spring 130 also permits the guide blade to be thrown back into the position shown in dotted lines in Fig. 9, whenever it is necessary to transfer a rib top to the needles. An open crotched slot 132—133, extends from the upper edge of this blade opposite the center of the needle cylinder which carries the thread for knitting the main structure of the stocking. This slot is thus crotched to favor the delivery of the feed thread to the needles in whichever direction the cylinder may be running as in reciprocating knitting. Whenever it is desired to produce plated work with two kinds of yarn, one thread is carried through the eye 131, and the position of this eye in relation to the crotch slots 132, 133, is such that the thread carried in the crotch slots appears in the finished fabric on the inside of the stocking, and the thread which passes through the eye 131 will appear on the outside of the work. This results from the fact that when the cylinder is running in one direction the inside thread in passing to the needles, by virtue of the drag put on it in drawing it in will run through that branch of the crotch which points in the direction the cylinder is running, and therefore will lead the outside thread which follows behind it from the eye 131. When the two threads are so fed to the needles, the inside thread in the lead followed by the outside thread, the leading thread will appear on the inside of the fabric, while the other will appear on the outside. Now, when the motion of the cylinder is reversed, it will whip the inside thread over to the other branch of the slot, thus giving it the lead when the cylinder is running in the opposite direction with the like result in the structure and appearance of the fabric. The splicing thread for reinforcing the heels and toes is carried through the eye 135 in the end of lever 134, which is pivoted on stud 136 of the guide blade 126. A spiral spring is coiled about this stud and has one end hooked to a stationary washer on the stud and the other end is carried over the top edge of the short arm of lever 134, so that its force is normally exerted to throw the eye 135 upwardly, or into the position seen in Fig. 21. By referring to Fig. 31, which is a view of these parts as seen looking at the guide blade endwise, it will be seen that the short arm of lever 134 has a depending extension or lip 138 which lies in front of a cam ledge 139, of the slide 118. This slide is moved toward the guide blade 126 by the shifting of coupling 9, (9), through arms 106 and 109 of rockshaft 107, and lever 117, which by means of pin 416, (21), connects arm 109 with slide 118, and when so moved, the ledge 139 will engage and pass under the lip 138 of the short arm of lever 134 and by lifting it will correspondingly depress the eye 135, and thus throw it into position opposite the crotch slot of the guide blade 126, and thus throw the splicing thread into the path of the needles.

Mounted on the upper table of the machine is a stand 140, in which is pivoted a swinging arm 142, which may be termed the cloth-depressor, as its function when turned down as seen in Fig. 9 is to crowd the fabric as it leaves the needles down into the interior of the cylinder. This is accomplished by the curved guard arms 143 and 144, the ends of which are upturned to permit the cloth to pass freely under them in the process of reciprocatory knitting. A crank arm 148, (21), extends from the rear end of the hub of the depressor with which a contractile spring 149 connects, its other end being attached to the table. As this crank arm swings past dead center the spring will hold the depressor down against the cloth as in Fig. 9, or up as seen in Fig. 21. The upthrow of the depressor is limited by the stop pin 150, and its downthrow by the pin 151. On the side of the depressor arm 142, is attached a pinch-blade 147, which presses the plate 146 on the side of arm 142. This is provided to hold the end of the main thread while the operator is taking off a stocking and running on a rib to commence another. A screw 145, also passes through the arm 142 exactly above the center of the post 153, the lower end which is pointed as shown in Fig. 21, at 145, and when the depressor is dropped to its working position this point seats itself in a socket therefor in the top of the post, as shown in Fig. 8, leaving a small space between the top of the post and the under side of the depressor. The office of this combination of depressor, screw and post-top is to seize and hold the end of the splicing thread after the finish of a heel or toe until it may next be called into action. This is accomplished in the following manner:—When the reciprocating action of the needle cylinder has started, and the thread-carrying lever 134 has thrown the splicing thread into position to be taken by the needles, it will be fed to the needles until the finish of the part which the thread is designed to reinforce, at which moment the lever 134 rises lifting the splicing thread with it and the continuous motion of the cylinder commences. This continuous circular motion will carry the end of the splicing thread, still adhering to the fabric, around and around the screw 145, and winds it thereon until the tension becomes so great that it breaks between the cloth and the screw. The coils of thread so wound on the screw are sufficient to hold the free end of the thread while the fabric is freed from the thread, which, as is plain, remains extending from the tension devices through the elevated eye 135, above the tops of the needles when elevated, to the screw 145. In this position the thread lies dormant, stretched across and above the path of the circle of needles. When the machine next shifts onto the heel or toe-knitting, the lever 134 will be lowered, carrying the splicing thread with it into the path of the needles and within reach of their hooks where it will remain and run to the completion of that part of the stocking.

*The stitch-holding devices.*—The stitch-holding devices and means for operating them are seen in Figs. 8 and 9. They consist of an annular bed 312, which is attached to and carried by the needle cylinder which is radially grooved for the reception of the sliding stitch-holding blades 570, each of which has a shank 305, which is acted upon by the cams 571, 571, and 308 (9), to impart to them their appropriate movements. The butts of these blades are notched to take on a spring band 306, which by its contraction tends to force the points of the blades toward or against the cloth where it draws over the top edge of the cylinder. The upper part of the front end of each blade is notched to form a hook to engage the top series of stitches as the blades pass the upraised needles to receive the feed thread opposite cam 308, and force them inwardly to put them out of range of the rising needles to avoid interference with the last course of stitches by those needles. These devices and their functions are well understood and require no further explanation as they form no part of this invention.

*The fashioning apparatus.*—The devices for fashioning the heel and toe of the stocking embrace two more than half the needles on the cylinder which are divided equally between a right hand and a left hand series. As elsewhere stated, they are actuated in their advance movement by the jacks shown in Fig. 12 and Fig. 34, which latter figure illustrates the terminal jack at the outside end of each series, its position being shown at 395 in Fig. 10. The jacks filling the grooves on the left hand side of the cylinder, (designated 397), are all of the form shown on the left of Fig. 12, while those on the right hand side are of the form shown on the right of that figure. The outside jack in the series on either hand is of the form shown in Fig. 34. All of the jacks are provided with race shanks $a, a, a$, which run in the shank race seen in Fig. 20. Jacks 396 and 397 are each provided with a lifting stem marked respectively $c$, and $b$. All are provided with a supporting shoulder $d$, and with a minor supporting ledge just beneath, marked $e$, on each figure of the jacks. These coöperate with the spring band 398, (12), which acts to sustain them in an elevated position whenever they are raised, so that the ledge $e$, comes above the band 398. When the jacks are out of action their race shanks run under the bottom of the cam 364, (20), and the cams 279 and 281, but when they are pushed up for fashioning purposes (by means hereinafter described), the race shanks stand at an elevation to run on top of the jack-raising cam 364, which cam effects their upward movement, while the initial step in their depression is effected by means of cam 367 and the final step by means of one or the other of the cams 279 or 281, according to which way the cylinder is running. These cams are shown in top plan view in Fig. 10, and in face view in Fig. 20. About half of each of their inside faces is fitted to the curve of the cylinder, but the remaining part of the face inclines away from the cylinder thus leaving a wedge-shape throatway between the face of the cam and the surface of the cylinder. Each of these cams has a stem 280, extending from its back side which acts as a slide and is carried in a box or slide-way 277, behind which is an expulsive spring 282, which acts to press the cam toward the cylinder. Thus when the jacks are elevated so that their race stems $b$, and $c$, in process of reciprocation encounter these cams in their path, if moving toward the under cam edge the stem will be drawn down by that edge, but if the cylinder is moving in the opposite direction so that the race stems will enter the said wedge-shaped throatway and the end of the stem impinges against the inside face of the cam, it will crowd the cam back against the spring 282, which yielding, the jack stem slides over the face of the cam which springs back into place after it has passed.

The outside jacks 395 are brought into operation only once in the process of knitting a heel. This occurs after the back part of the heel has been formed by narrowing and before the widening to form the sole part of the heel has commenced. Referring to Fig. 10, the right hand jack 395 is first raised after the narrowing is completed. At the completion of the next movement of the cylinder both outside jacks are raised. At the termination of the next oscillation, which is the normal forward movement the right hand jack is dropped out of action and on the following reverse oscillation the left hand jack 395 is dropped out of action. On the completion of the process of narrowing the heel, those needles which have been thrown out of action by that process are all returned to operation by means of the lifting plates 474, 474, being projected under the bottom ends of the jacks 396, and 397 at the next reciprocation of the needle cylinder after the finish of the last narrowing course. This is effected as follows: Each of the fashioning racks 401 and 405, has a block, 402 and 406, respectively, attached to its under side at one end as seen in Fig. 13 and in dotted lines in Fig. 12. Each of these blocks has a lug $b$, depending from its under side which in service engages a cam-face $c$, of lever 479 which is shown in Fig. 17 and in part in Fig. 11. Lever 479 has a pivot-bore at $a$, which takes over a pivot stud 480, (11), about which it can oscillate. One end of this lever is forked as at $b$, (17), which fork coöperates with a stud 472$^a$ on the pick-up slide 474 (11). This slide 474 seen in plan in Fig. 11 and in edge view in Fig. 8, is a thin plate of T shape, the outer edge being concaved to fit the outside of the needle cylinder, and is attached to a sliding block 472 (8) which reciprocates in a stand 470 or 471, (8, 11, 11$^a$). A retractile spring 477 (8), connects stud 472$^a$ on slide 472 with stud 471$^c$ (8) on the stand 471, and in service its stress is exerted to draw the pick-up plate 474 backwardly. In operation, when in process of narrowing, the racks have been dogged around until the pins 402$^b$, and 406$^b$ are about to contact with the cams $c$, of levers 479, the next reciprocation of the platform 267, will cause the pins $b$, $b$, of 402 and 406 to impinge against the cams of levers 479, thereby turning said levers on their centers 480 and throwing the lifting plates 474, 474 under all the jack stems. The ensuing vertical movement of the platform 267 will force up all the instep needles into position for knitting when the next following reciprocations will effect the knitting of one or more courses embracing the terminal needles 395, 395. This being done the reverse process of widening to form the sole of the heel commences. Thus a diagonal course of stitches is run in extending from the apex of the heel around to the ankle on one side, thence back to the apex and around to the ankle on the other side and back to the starting point at the apex. This is for the purpose of rendering the diagonal seam more elastic, and also for the additional purpose of more perfectly taking up the stitches of the heel along such diagonal line and casting them off before the sole part of the heel is knit. From this point the regular widening of the sole part of the heel now proceeds, and consists of a duplicate reversal of the narrowing process just described.

*Mechanism for controlling the action of the needle jacks.* (Figs. 11, 12 and 20.)— The provisions for elevating, supporting and drawing down the needle jacks in the heel-fashioning process are seen in Figs. 10 11, 12 and 20, in which in Figs. 11 and 12 the parts are shown as they appear with the jacks elevated. A semi-circular platform 267 is provided for carrying the fashioning racks 401 and 405, and the pawls for operating them. This platform has two cylindrical plungers 275, 275, depending from its under side which are fitted to slide vertically in two sockets 274, 274, which rise from the upper side of cylinder gear 82 and revolve with it. On the upper side of gear 82 a stand 268 is attached which forms a bearing for a short rockshaft 269, (11, 12.)

An arm 270 extends from the outer end of this shaft which carries a truck roller 271, and from the inner end another arm 272, which also carries a roller 273. The roller 271 is designed to run over the top of cam 78 when that cam is pushed into its path as elsewhere described, and when so pushed in, as by the reciprocation of the needle cylinder it is driven over the top of that cam, it rises and at the same time by lifting roller 273 it lifts the platform 267 and with it the racks 401 and 405. The inner edge of rack 401 extends under the projecting lifting stems c, c, of the jacks 396, while the rack 401 has an attached lifting plate 409 which extends under the stems b, b, of the jacks 397, and thus all the jacks on each side of the cylinder whose stems overhang the racks will be lifted whenever roller 271 runs over cam 78. In continuous circular knitting the jack shanks a, a, run below the needle actuating cam 364, (20), and the office of the racks in pushing up the jacks is to put their shanks in line with the mouth of the shank race above the cam 364 so that their passage through that race will push up the needles to take the feed thread, their draw-down being effected by the cam 342, (20), the jacks being sustained in their elevated positions preliminary to their entering the cam race after passing the lifting roller 273 by the contraction of the spring band 398 about them under the shoulders 396, 397 d, d.

*The narrowing and widening mechanism.* (Figs. 1, 2, 3, 5, 7, 10, 12, 16 and 35.)—The mechanism for narrowing and widening the fashioned parts of the heel and toe of the stocking and its mode of operation are as follows:—The under rack 401, has a concentric rib k, (35), on its under side which rides in a concentric groove in the upper side of platform 267, as seen in cross-section in Fig. 35. Its upper side is also similarly grooved as at g, (12, 35), for a rib t, on the under side of the upper rack 405. Both racks are toothed at their outer edges to coöperate with the pawls by which they are moved. One half of the interior edge of rack 401 extends under the lifting stems c, of jacks 396, (10, 12), and rack 405 has a lifting plate 409 on its upper side which extends under the lifting stems b, b, of the jacks 397. The racks are each provided with a downwardly projecting pin b, Figs. 8, 10, 18, 19, which as the racks are moved toward the front of the machine will engage a cam-face c, of a lever 479, (17), (11), and by their further movement, will swing such levers on their pivots 480, (11). The opposite arm of these levers 479 is forked to engage a pin 472ª, which is an appendage of the slide 472, (8). To the under side of slides 472 are attached the jack-lifting plates 474 each of which has a transverse head which will be moved under the bottom ends of the long needle jacks, 396, so that when the plate 267 is lifted, those jacks and their needles will be restored to service. This function is performed in turning the apex of the heel and results in knitting a diagonal course of stitches in between the terminal stitches of the narrowing and widening courses at the angle of the heel. Thus, when the platform is elevated these racks will lift all the jacks whose stems lie over these plates. In knitting a heel or toe the process of narrowing the rear part of the heel or the sole of the toe, is done by moving these lifting plates toward each other so as to drop out of service one or two as required, of the rear jacks, and the widening is accomplished by the reverse operation of working the racks back step by step, thus bringing into action one or two of the idle jacks at a time on each flank of the heel, in precisely the reverse order of their dropping out in the narrowing process. To effect these step by step movements of the racks four bell cranks, 425, 429, 434, and 438, (10), are pivoted on the platform 267, on the centers 423, 424, 424 and 423 respectively. Each crank carries a pawl 427 and the cranks 425 and 429 on the left hand side of the cylinder operate on the lower rack 401, crank 425 to push that rack to the right or toward the center of the front of the cylinder, and crank 429 in the opposite direction. The cranks 434 and 438 operate on the upper rack 405, crank 438 to push rack 405 toward the center and crank 434 to push it in the opposite direction. These cranks are fitted with swinging levers 426, 430, 435 and 439 respectively, which are pivoted on the cranks so that they may oscillate thereon. On each crank is an upraised shoulder such as are seen on the cranks 425 and 438 to limit the swing of the arms in one direction, and springs 437 are connected with the inner arms of these levers and with studs on the cranks to throw the long arms of the levers toward the shoulder stops.

The two inside cranks are fitted with similar levers 430 and 435, and shoulder stops on their under sides, seen in Fig. 1, and their short arms are connected by the retractile spring 447, which acts to throw the latter levers toward their respective stops. Each of these levers is provided with a friction roller a, which in practice contacts with the cam faces by which they are actuated. The outside pair of these rollers operate in a plane above the plane of movement of the inside pair. The upper pair carried by the cranks 425 and 438, perform the narrowing function while the lower pair, carried by the cranks 429 and 434, perform the widening function in forming the heels and toes. The cranks are operated by the two crescent cams 260 and 265. The working edge of cam 260 is enough nearer to the needle cylinder than the edge of the cam 265 to effect a movement of the bell crank when actuated by it of two needles, while that of cam 265 will move the racks a distance equal to only one needle. These crescent cams are supported on the tops of two vertical sliding posts 258 and 263, (2, 3, and 10), and are prevented from lateral deflection by rear extensions which lie and slide in the guide seats 261 and 266. Slides 258 and 263 pass down through the table 81, and are carried on the ends of the arms 255 and 256, the other ends of which are connected with the spindles 253 and 254, (1). In Fig. 1, it will be seen that these spindles pass down through bearings in the machine frame 252 and terminate directly over the fashioning pegs of the pattern wheel 236. Two collars 512, attached to the spindles serve to limit their drop and two similar collars 251, limit their rising movement. These collars are so adjusted that when the spindles are thrown to the limit of their upward stroke, they will be carried up high enough for the highest pins on the pattern wheel to pass under their bottom ends, and when dropped to the lowest limit of their stroke their lower ends will clear the surface of the pattern drum 236, and the crescent cams will then be below the path of travel of the lower pair of bell crank rollers 430ª, and 435ª. The spindles 253 and 254 are raised by means of arm 247 of a bell crank 246 pivoted on stud 245, (2, 5), the free end of which plays under pins 249 which project from the collars 513, which can slide on the spindles, being limited in their drop by the fixed collars 514, 514, (1, 2,). Between collars 514 and 251 are the expansive springs 250, the stress of which is exerted between collars 513 and 251. The strength of these springs is sufficient to more than support the spindles and their attachments, so that when they are lifted by cam 247 they rise until the upper collars 251 strike the under side of the upper member of the frame 252 which arrests further advance. If the upstroke of arm 247 goes beyond this point, the springs 250 yield and the collars 513 rise with the arm. On the reverse movement of the arm the springs act to force the collars 513 down until they rest on collars 514, and further descent of the spindles is arrested by collars 512 striking the cross-bar 252ª, where they rest.

The lower arm of the bell crank 246 hangs in the path of a vibrating striker 241. (2, 5, 7,), which is carried on the rock-shaft 25 and is fitted to oscillate therewith and slide thereon into and out of position to engage the arm 246 of the bell crank above it. For this purpose as shown in Fig. 7 the hub 239 has an elongated slot through which the pin 240 projects from the shaft 25 to permit the hub to be slid into and out of position to engage arm 246, and at the same time to provide for its oscillation with the shaft 25 and in unison with the sector gear 28. This striking arm is controlled in its movements by means of the shifting lever 237, which is under the control of the cams 223 and 225 on the cam wheel 210, (2). When the machine is running on continuous circular knitting as on a leg or foot, one or the other of these cams is behind the end of lever 237 in the relative position seen in Fig. 5, with the striker shipped out of working position in relation to the arm 246, so that the oscillations of shaft 25 produce no effect on the fashioning apparatus or on the crescent cams, but when either of those cams 223 or 225 runs out of engagement with the end of lever 237, a spring 243, (5), which is attached to the inner end of lever 237 and to the frame of the machine, instantly acts to draw the hub 239 and arm 241 into working position as shown in Fig. 7. Thereafter the rocking of shaft 25 will cause the striker 241 to engage the arm 246 and by swinging it effect the elevation of the spindles 253 and 254 and the attached crescent cams by the means before described.

*The pattern drum, its functions and the order of their performance.* (Figs. 2, 10, 29 and 36.)—Preliminary to a description of the pattern drum and its functions, it may be premised that when the fashioning mechanism is in action, if the crescent cam 265 be raised to the plane of the rollers of the cranks 429 and 434, when the platform is oscillated from left to right, Fig. 10, the roller of the crank 429 will engage the end of cam 265 and, yielding to the impact, the lever will swing back and pass over the cam without turning the bell crank 429 to which it is attached. The trailing roller of lever 435 on bell crank 434, however, when it strikes cam 265 cannot thus turn back by reason of the shoulder behind it, and hence, standing to its work, the cam pushes it inwardly and by turning the crank 434, through its pawl 427, feeds rack 405 along one tooth to the right, and by doing so withdraws its heel from under the lifting stem of the last jack resting upon it and leaves that jack and its corresponding needle out of action. The return oscillation performs the like operation with the bell crank 429, which leaves out of action this last jack and its needle on the right of the series resting on rack 401. In this way the narrowing will proceed regularly by dropping one needle at a time out of action as long as cam 265 is left standing flush with the rollers of the two inside cranks. If cam 265 be dropped out of operative position and cam 260 be thrown in, the mode of operation will be the same except that the narrowing will proceed by dropping out of play two jacks and needles on each side at each reciprocation instead of one. The widening is accomplished by throwing one or the other of the crescent cams into the path of the rollers on the two outside cranks 425 and 438, which will result in oppositely working back the racks to their original positions.

The limits of the elevation of the crescent cams and the order of their elevation in relation to each other, are determined by the pegs on the pattern wheel 236. The axis of revolution of this wheel or drum is parallel with that of the driving shaft and perpendicular to a fore and aft plane through the axis of the needle cylinder. The arrangement last mentioned in relation to the axis of the needle cylinder is of importance as it contributes to the simplification of the working parts of the fashioning apparatus whereby the weight of many parts has been materially diminished and many parts heretofore employed in machines adapted to knit heels with short supplemental courses have been altogether dispensed with, whereby a much larger production per machine has been secured, due to the higher rate of speed at which the machines can be run.

For the purpose of exhibiting the scheme for arranging the pegs around the drum of the pattern wheel to produce a stocking with supplemental courses of stitches knit in at intervals between the regular courses of stitches in the formation of the rear and sole portions of a fashioned heel, the diagrams seen in Figs. 29 and 36 are presented. The side view of the pattern wheel shown in Fig. 2 exhibits all the pegs in the scheme for one size and style of stocking, but as it is difficult to distinguish the pegs of the front from those of the rear row, the diagram, Fig. 29 is drawn with the two rows arranged in concentric circles of different diameters so that the eye may take in at a glance the relation between the two series of pegs.

The pattern wheel consists of a plain cylinder of sufficient diameter to carry any peg design within the range of sizes of stockings called for by the trade. It is located directly under the spindles 253 and 254. Connected with it is a ratchet 233, (2), which is propelled by a pawl 232 connected with the arm 230, which is attached to and vibrates with the rockshaft 25 in unison with the sector gear 28. The engagement of this pawl with the ratchet is controlled by a fender 229 which is dropped when the shift from continuous to reciprocating motion of the needle cylinder occurs, thus letting the pawl engage the ratchet, and raised at the completion of the heel when continuous knitting is resumed.

The spindles 253 and 254 are adjusted so that when dropped the crescent cams will stand just below the rollers of the central pair of bell cranks and the bottom ends of the spindles will just clear the surface of the pattern drum. This drum 236, is shown as fitted with two rows of screw holes, one on either margin of the drum, of eighty holes in each row, to receive the pegs shown in the margin of Fig. 29. These pegs are screws having elongated heads of different heights and are adapted to screw into the holes in the drum. They can be differently disposed to produce different results in the making of the heel of a stocking according to the necessities of the case or the design of the operator. Of these two series of pegs on the drum, the left hand series, or that on the outside margin of the drum as viewed from the front of the machine, coöperates with the crescent cam 260, through the lifting spindle 253, and the right hand series with the cam 265 through the lifting spindle 254. In practice both of the crescent cams are never operated at the same time. It will be remembered that when the bell cranks which operate the fashioning racks pass over cam 265 it will effect a movement of their pawls of only one tooth of the rack, which represents the falling out or throwing in of one needle jack or one needle of the fashioning series of needles, and it will either widen or narrow according to the degree of its elevation, if set in its lowest position it will narrow, and in its highest position it will widen a single needle at a time. The cam 260 operates in the same manner, except that it acts upon the bell cranks to move the racks two needle spaces instead of one at a stroke. In operation both crescent cams are lifted at each reciprocation of shaft 25 by the lifter 247, actuated by the striker 241, and both spindles will be raised high enough for the highest pegs of the pattern drum (which are the widening pegs,) to clear their bottom ends when the drum is fed along by the pawl 232. Then the pawl recedes and the spindles fall together, one of them descending until its collar 512 rests on the cross-bar 252ᵃ, and the other until its bottom end rests on the top of the peg beneath it. If that peg be a short one in the right hand series it will leave crescent cam 265 set for the narrowing bell cranks 429 and 434, (10), to engage, and in the reciprocation of the cylinder one of these cranks will feed forward one of the fashioning racks one tooth and thus withdraw its support from under the outside needle jack of the series on that side of the cylinder, while the other crank will perform a similar function on the jacks of the other side. Likewise, if it is a short peg of the left hand series which stops under spindle 253, then crescent cam 260 will be raised and a narrowing by two needles at a step ensue. Inversely, if a high peg of the left hand series comes into position under the spindle, the crescent cam 260 will be left elevated in the path of the bell cranks 425 and 438, which will result in feeding the racks forward from their narrowed position back toward their original position, thus widening the fabric by two needles at a step.

In Fig. 29 the right and left hand series of pegs have been marked in such a way as to bring clearly before the eye the order and character of the successive steps to knit the heel of a stocking with short supplemental courses of stitches interspersed at regular intervals between the fashioning courses of the fabric, to give the heel greater fullness. In this scheme those pegs which effect a narrowing by one needle at a time are marked $n'$, which may be read "narrows one needle", those which narrow by two needles at a step are marked, $n''$, signifying "narrows two needles". The pegs which widen by one needle at a step are marked, $w'$, meaning, "widens one needle", while those that widen by two needles at a step are marked, $w''$, meaning, "widens two needles". The drum is supposed to rotate in the direction of the arrow. Commencing at the top of the diagram, Fig. 29, at A, if both spindles 253 and 254 are raised and the drum advanced one step, a short peg $n'$ will first be carried under spindle 254 and no peg under the other spindle. When the spindles drop cam 260 on spindle 253 will drop below the bell cranks and remain out of action, while spindle 254 which supports cam 265, will rest on peg $n'$ with cam 265 in position to turn the narrowing bell cranks one on the direct and one on the return stroke, thereby moving the racks in toward each other one tooth each, which will leave out of future action one needle of the series on each side next to needle 395. The next reciprocation will carry into operative position the next peg $n'$ with a like result. The next reciprocation will carry the peg $n''$ of the left hand series into operative position under the spindle 253, which puts cam 260 into position to narrow two needles of each series. The next reciprocation brings peg $w'$ into operative position under spindle 254 with the result that cam 265 will be raised to a position to actuate the outside bell cranks, 425 and 438, which results in widening the fabric by one needle. The result of these operations as exemplified in the fabric, is illustrated in Fig. 36. In this figure the vertical lines represent needles and the horizontal lines represent a single continuous thread as it traverses the diagram back and forth as in the heel itself, the rear and sole parts being separated on the diagonal seam and unfolded to better expose the structural features of the fashioned fabric. In Fig. 36 the first and second narrowed courses are marked by the same letters as the pegs on the drum by which were produced, viz.—$n'$, $n'$. The following course corresponding to that produced by the peg $n''$, is marked $n''$. Then follows the widened course which is marked $w'$ to correspond with peg $w'$, of Fig. 29. After this the narrowing by the steps $n'$, $n''$, $w'$, proceeds until the point B, in both diagrams is reached, beyond which the supplemental courses are omitted and the narrowing proceeds by a single needle at a stroke until the apex of the heel at J, J, Fig. 36 is reached. Here the pick-up slides 474, 474, are thrown into action and the long course at C, C, Fig. 36, is knit in. Thence the fabric from J to D, is widened one needle at a course on each side until at D, Fig. 29, the supplemental courses commence again, and the pegs $n'$, $w''$, $w'$, Fig. 29, which produce the corresponding courses $n'$, $w''$, $w'$, Fig. 36, come into action, and are repeated until the heel is completed, which occurs when the long pin at E, Fig. 29, has passed spindle 253. While the pattern drum is moving from E, to F, (29), the foot of the stocking is being knit.

We therefore claim as our invention and desire to secure by Letters Patent, the following:

1. In a machine for knitting stockings, the combination of a needle cylinder and independent needles and means for oscillating the cylinder and actuating the needles, two fashioning racks, two sets of propellers for moving said racks in opposite directions arranged to operate in different planes, two cams of differential capacity in relation to the throw of the racks with which said propellers coöperate to move them, and means for throwing said cams into their operative positions by a movement perpendicular to the plane of action of said propelling devices, substantially as specified.

2. In a machine of the class described, the combination with the needle cylinder, needles and means for actuating them, the fashioning racks, bell cranks, pawls and actuating levers connected therewith, the latter being divided in two sets and disposed in two different planes, of two cams with which said actuating levers coöperate, one of said cams being adapted to effect a movement of the racks greater than the other by a definite number of needles, and means connected with said cams for setting each of them at an elevation to coöperate with either of said actuating levers, substantially as specified.

3. In a machine for knitting stockings, the combination of a main driver, a separate oscillating member driven by said main driver, a vertical needle cylinder and needles, means for actuating them, an axially horizontal pattern wheel, means connected with the oscillating member for actuating said wheel, fashioning mechanism connected with the cylinder, cams for actuating said fashioning mechanism, and means intermediate the pattern wheel and said cams adapted to be actuated by the oscillating member, for throwing the fashioning mechanism into and out of operative position; substantially as specified.

4. The combination with the needle cylinder and needles and means for reciprocating them, of narrowing and widening mechanism for fashioning the heel and toe of a stocking, a pattern wheel having rotary but no axial movement, two parallel circumferential rows of fashioning pegs thereon, of different heights, movable slides and fashioning cams attached thereto to coöperate with said pegs, the extent of whose sliding movement is governed by the height of said pegs and the altitude of which determines whether the fashioning is to be done with one or two needles at a time, and means for rotating the pattern wheel and reciprocating the slides and cams, substantially as specified.

In testimony whereof we have hereunto subscribed our names at Bennington, Vermont this 21st day of November, 1906, in the presence of two witnesses.

GEORGE E. COTTRELL.
STEPHEN L. SHIPPEY.

Witnesses:
JOHN H. FROST,
RICHARD J. LONGTIN.